US009129284B2

(12) United States Patent
Sarkissian et al.

(10) Patent No.: US 9,129,284 B2
(45) Date of Patent: Sep. 8, 2015

(54) SYSTEMS, METHODS AND APPARATUSES FOR SECURE DIGITAL TRANSACTIONS

(76) Inventors: Shaunt Mark Sarkissian, Saratoga, CA (US); Vahe Andre Sarkissian, Saratoga, CA (US)

(*) Notice: Subject to any disclaimer, the term of this patent is extended or adjusted under 35 U.S.C. 154(b) by 2039 days.

(21) Appl. No.: 11/851,248

(22) Filed: Sep. 6, 2007

(65) Prior Publication Data

US 2009/0070271 A1   Mar. 12, 2009

(51) Int. Cl.
G06Q 20/00 (2012.01)
G06Q 20/40 (2012.01)
G06Q 20/38 (2012.01)

(52) U.S. Cl.
CPC ........ *G06Q 20/385* (2013.01); *G06Q 20/38215* (2013.01); *G06Q 20/40* (2013.01); *G06Q 20/401* (2013.01); *G06Q 20/4037* (2013.01)

(58) Field of Classification Search
USPC .......................................................... 705/75
See application file for complete search history.

(56) References Cited

U.S. PATENT DOCUMENTS

| 5,187,351 | A | 2/1993 | Clary |
| 5,499,298 | A | 3/1996 | Narasimhalu et al. .......... 380/25 |
| 6,167,521 | A | 12/2000 | Smith et al. .................... 713/200 |
| 6,314,409 | B2 | 11/2001 | Schneck et al. ................. 705/54 |
| 6,408,284 | B1 | 6/2002 | Hilt et al. ......................... 705/40 |
| 6,446,052 | B1 | 9/2002 | Juels .............................. 705/69 |
| 6,742,704 | B2 * | 6/2004 | Fitzmaurice et al. ......... 235/380 |
| 6,834,351 | B1 | 12/2004 | Kabenjian ..................... 713/201 |
| 6,912,653 | B2 | 6/2005 | Gohl |
| 6,915,279 | B2 | 7/2005 | Hogan et al. |
| 6,996,542 | B1 | 2/2006 | Landry ........................... 705/40 |
| 7,107,445 | B2 | 9/2006 | Strapp et al. .................. 713/150 |
| 7,243,842 | B1 | 7/2007 | Leon et al. |
| 2001/0029473 | A1 | 10/2001 | Yamaoka et al. |
| 2002/0062286 | A1 | 5/2002 | Tedesco et al. ................. 705/45 |
| 2002/0128965 | A1 | 9/2002 | Sacal Y Micha ............... 705/39 |
| 2003/0061170 | A1 | 3/2003 | Uzo ................................ 705/64 |
| 2003/0115147 | A1 | 6/2003 | Feldman et al. |
| 2003/0120611 | A1 | 6/2003 | Yoshino et al. ................ 705/67 |
| 2003/0149662 | A1 | 8/2003 | Shore ............................. 705/39 |
| 2003/0200180 | A1 | 10/2003 | Phelan, III et al. ............ 705/65 |
| 2004/0011864 | A1 * | 1/2004 | Thompson et al. ........... 235/380 |

(Continued)

FOREIGN PATENT DOCUMENTS

WO   WO 2009032041 A1 *   3/2009   ............... H04L 9/32

OTHER PUBLICATIONS

International Search Report and Written Opinion from PCT Application No. PCT/US08/09299 mailed on Nov. 4, 2008.

(Continued)

*Primary Examiner* — James A Reagan
(74) *Attorney, Agent, or Firm* — K&L Gates LLP

(57) ABSTRACT

A method for authorizing recurring transaction according to one embodiment includes receiving a defined payment amount associated with a user or entity. Additionally, the method includes receiving a first code associated with a first predetermined currency value, where the first code is also associated with the user or entity. Furthermore, the method includes verifying an availability of funds to pay the defined payment amount and authorizing payment of the defined payment amount if funds are available to pay the defined payment amount. Further still, the method includes generating a new code associated with a new predetermined currency value, and sending the new code to a sender of the defined payment amount.

33 Claims, 29 Drawing Sheets

(56) References Cited

U.S. PATENT DOCUMENTS

| | | |
|---|---|---|
| 2004/0083189 A1 | 4/2004 | Leon |
| 2004/0122769 A1 | 6/2004 | Bailo et al. .................. 705/42 |
| 2004/0181673 A1 | 9/2004 | Lin et al. .................... 713/182 |
| 2005/0004978 A1 | 1/2005 | Reed et al. |
| 2005/0017068 A1 | 1/2005 | Zalewski et al. ............ 235/380 |
| 2005/0060266 A1 | 3/2005 | DeMello et al. |
| 2005/0091534 A1 | 4/2005 | Nave et al. .................. 713/201 |
| 2005/0120245 A1 | 6/2005 | Torisaki et al. ............. 713/201 |
| 2005/0165681 A1 | 7/2005 | Heinemann et al. ......... 705/40 |
| 2005/0177502 A1 | 8/2005 | Thomas ........................ 705/40 |
| 2005/0177503 A1 | 8/2005 | Thomas ........................ 705/40 |
| 2005/0234834 A1 | 10/2005 | Taylor |
| 2005/0240587 A1 | 10/2005 | Asami et al. |
| 2005/0246292 A1 | 11/2005 | Sarcanin |
| 2005/0269398 A1 | 12/2005 | Robinson et al. ............ 235/380 |
| 2005/0273399 A1 | 12/2005 | Soma et al. .................. 705/26 |
| 2005/0273843 A1 | 12/2005 | Shigeeda ...................... 726/5 |
| 2005/0278259 A1 | 12/2005 | Gunaseelan et al. |
| 2006/0031160 A1 | 2/2006 | Villa ............................. 705/44 |
| 2006/0080226 A1 | 4/2006 | Pickering .................... 705/37 |
| 2006/0087882 A1 | 4/2006 | Kinsley ....................... 365/185.04 |
| 2006/0095369 A1 | 5/2006 | Hofi |
| 2006/0206403 A1* | 9/2006 | Gill et al. .................... 705/35 |
| 2006/0235775 A1 | 10/2006 | Pollin .......................... 705/30 |
| 2006/0271493 A1 | 11/2006 | Stefik et al. |
| 2007/0007329 A1 | 1/2007 | Grovit .......................... 235/379 |
| 2007/0007330 A1 | 1/2007 | Grovit .......................... 235/379 |
| 2007/0067833 A1 | 3/2007 | Colnot ......................... 726/9 |
| 2007/0094097 A1 | 4/2007 | Owurowa et al. ............ 705/26 |
| 2007/0094150 A1 | 4/2007 | Yuen et al. ................... 705/64 |
| 2007/0100749 A1 | 5/2007 | Bachu et al. ................. 705/42 |
| 2007/0100752 A1 | 5/2007 | Wallaja et al. ............... 705/44 |
| 2007/0192140 A1 | 8/2007 | Gropper |
| 2007/0219917 A1 | 9/2007 | Liu et al. |
| 2007/0226142 A1 | 9/2007 | Hanna et al. |
| 2007/0265970 A1 | 11/2007 | Kahn et al. |
| 2008/0027858 A1 | 1/2008 | Benson |

OTHER PUBLICATIONS

U.S. Appl. No. 11/551,215, filed Sep. 6, 2007.

Non-Final Office Action Summary from U.S. Appl. No. 11/851,215 mailed on Feb. 10, 2009.

Final Office Action Summary from U.S. Appl No. 11/851,215 mailed on May 21, 2009.

Non-Final Office Action Summary from U.S. Appl. No. 11/851,215 mailed on Jan. 22, 2010.

Class String, http://web.archive.org/web/2004122422223/http://www.ruby-doc.org/core/classes/String.html , Jan. 10, 2010, p. 1-24

Free C/C++ Sources for Numerical Computation, http://web.archive.org/web/20041204075628/http://cliodhna.cop.uop.edu/~hetrick/c-sources.html , Jan. 10, 2010, p. 1-48.

Mathtools.net : C,C++/Algorithms and Data structures, http://web.archive.org/web/20041204082459/www.mathtools.net/C__C__/Algorithms__and__Data__structures/index.html, Jan. 11, 2010, p. 1-7.

Module: Kernel, http://web.archive.org/web/20041020104853/http://www.ruby-doc.org/core/classes/Kernel.html, Jan. 11, 2010, p. 1-21.

Final Office Action Summary from U.S. Appl. No. 11/851,215 mailed on Aug. 9, 2010.

U.S. Appl. No. 11/851,201, filed Sep. 6, 2007.

Non-Final Office Action Summary from U.S. Appl. No. 11/851,261 mailed on Oct. 30, 2009.

U.S. Appl. No. 11/851,277, filed Sep. 6, 2007.

Non-Final Office Action Summary from U.S. Appl. No. 11/851,277 mailed on May 14, 2010.

* cited by examiner

SYSTEMS, METHODS AND APPARATUSES FOR SECURE DIGITAL TRANSACTIONS

FIELD OF THE INVENTION

The present invention relates to electronic transactions, and more particularly to systems, methods, and apparatuses for secure currency-related transactions.

BACKGROUND OF INVENTION

The rapid growth and evolution of the traditional and electronic commerce markets has resulted in the widespread demand for monetary payments by digital transaction. However, current payment systems are highly fragmented and insecure, which creates a threat of data compromise and theft during the transfer and use of electronic commerce data. This threat may result in losses for corporations as well as users of such systems, and these losses factor into escalating merchant fees and client costs.

SUMMARY OF INVENTION

A method for authorizing recurring transactions according to one embodiment includes receiving a defined payment amount associated with a user or entity. Additionally, the method includes receiving a code associated with a first currency value, where the code is also associated with the user or entity. Furthermore, the method includes verifying an availability of funds to pay the defined payment amount and authorizing payment of the defined payment amount if funds are available to pay the defined payment amount. Further still, the method includes generating a new code associated with the first or a new currency value, and sending the new code to a sender of the defined payment amount.

A method for processing recurring transactions according to another embodiment includes sending a request for payment of a defined payment amount to a third party, the defined payment amount being associated with a user or entity; sending a code associated with a first currency value to the third party, the code also being associated with the user or entity; receiving payment equaling the defined payment amount; and receiving a new code associated with the first or a new currency value, the new code.

A method for processing recurring transactions according to another embodiment includes sending a defined payment amount and a code to a third party, the defined payment amount and code being associated with a user or entity; receiving a new code associated with, a predetermined currency value, the new code being associated with the user or entity; sending a request for payment of the defined payment amount and the new code; and receiving payment equaling the defined payment amount.

Additionally, a composite code structure corresponding to a currency value, according to another embodiment, comprises a first code and a security code embedded in the first code thereby forming a composite code, where the composite code corresponds to a currency value, and wherein the composite code includes a notation specifying an intended use of the composite code.

Furthermore, a composite code structure corresponding to a currency value, according to another embodiment, comprises a first code and a security code embedded in the first code thereby forming a composite code, where the composite code corresponds to a currency value, and wherein the composite code includes a notation specifying a maximum value that can be associated with the composite code.

Other aspects and advantages of the present invention will become apparent from the following detailed description, which, when taken in conjunction with the drawings, illustrate by way of example the principles of the invention.

BRIEF DESCRIPTION OF THE DRAWINGS

For a roller understanding of the nature and advantages of the present invention, as well as the preferred mode of use, reference should be made to the following detailed description read in conjunction with the accompanying drawings.

Various embodiments of the present invention are described in further detail below with reference to the figures, in which like items are numbered the same in the several figures.

DETAILED DESCRIPTION

The following paragraphs describe certain features and combinations of features that can be used in connection with each of the methods, systems and apparatus of the invention, as generally described above. Also, particular features described hereinafter can be used in combination with other described features in each of the various possible combinations and permutations. As such, the invention is not limited to the specifically described embodiments.

Unless otherwise specifically defined herein, all terms are to be given their broadest possible interpretation including meanings implied from the specification as well as meanings understood by those skilled in the art and/or as defined in dictionaries, treatises, etc.

Composite Code

Figure 1:
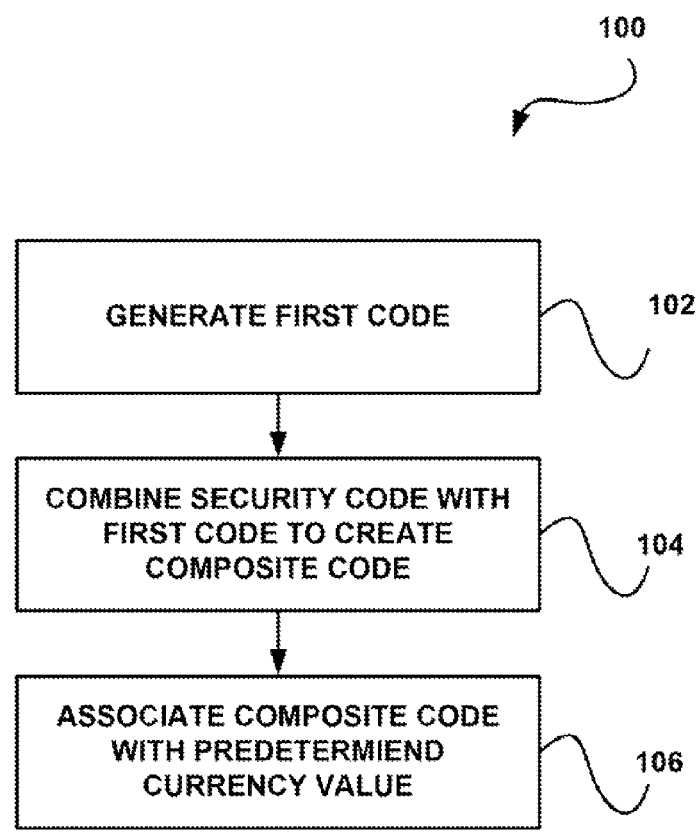
FIG. 1 represents a preferred general method for generating a code representative of a currency value, in accordance with one illustrative embodiment.

FIG. 1 represents a preferred general method 100 for generating a code representative of a currency value, in accordance with one illustrative embodiment. As shown, a first code is generated in operation 102. The first code may be any type of code. For example, the first code may include continuous or discontinuous strings of characters comprising one or more alphabetical and/or numeric characters, symbols, binary values, etc., and combinations thereof. The term "characters", while including the traditional types described above, is also meant to encompass electronic representations of characters as well.

In operation 104 a security code is combined with the first code for creating a larger composite code. In the context of the present description, the security code may be any code used for security purposes. For example, the security code may be one or more characters such as alphabetic symbols, numeric symbols, other symbols, alphanumeric strings, binary values, etc.

The composite code is associated with a predetermined currency value in operation 106. The composite code is usable in a monetary transaction. In the context of the present description, the predetermined currency value may be any value denoting a currency amount that has been predetermined. Furthermore, the monetary transaction may be any transfer of financially-related data.

In various general approaches of the general method, the security code may be embedded in the first code in any possible configuration. For example, as shown generally in FIGS. 2, 3A and 3B, the security code may be inserted at one end, or between the ends of the first code. In another example, the security code may not be a consecutive string in the composite code. For instance, the security code may be split into two or more portions within the composite code. Further, the position of the security code in the composite code may be selected by a user.

Furthermore, the size of the composite code may be predetermined. For example, the size of the composite code may be set a specific size, limited to a certain range, etc. For example, the composite code may have less than about 100 characters, less than about 80 characters, less than about 50 characters, less than about 30 characters, less than about 20 characters, etc. Embodiments having longer characters strings are also contemplated.

In yet another preferred general approach, a composite code structure corresponding to a currency value is presented. Examples of composite code structures are shown FIGS. 2-5. The structure comprises a first code. Additionally, the composite code structure comprises a security code embedded in the first code thereby forming a composite code. Also, the composite code corresponds to a predetermined currency value. Further, the composite code is used in a monetary transaction. The code may be prefunded or unfunded.

Figure 2:
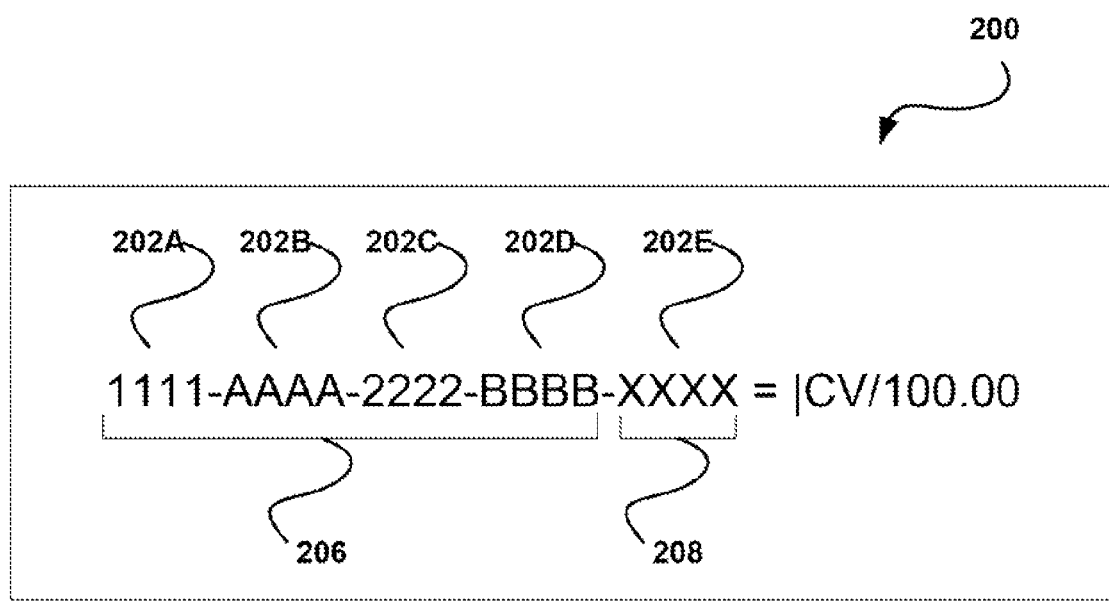
FIG. 2 shows a composite code utilizing a sequence of characters, in accordance with one illustrative embodiment.

In a particularly preferred general approach one embodiment of the composite code includes a sequence of characters. This sequence of characters may be divided into character sections, e.g., in halves, thirds, quarters, quintiles, etc. For example, in a preferred general approach, as shown in FIG. 2, the quintiles are shown as 202A-E. The complete sequence of characters is known as the composite code composite sequence 200. The composite code then includes two primary segments, referred to as the composite code core structure 206, and the user-specified PIN-code section 208. The composite code core section may comprise a sequence of randomly and/or sequentially generated characters. In the above embodiment, a PIN code section 208 may refer to a Personal Identification Number, password, or any other code. In particularly preferred approaches, the PIN code section 208 correlates to the security code portions of the composite codes described herein.

Figure 3A:
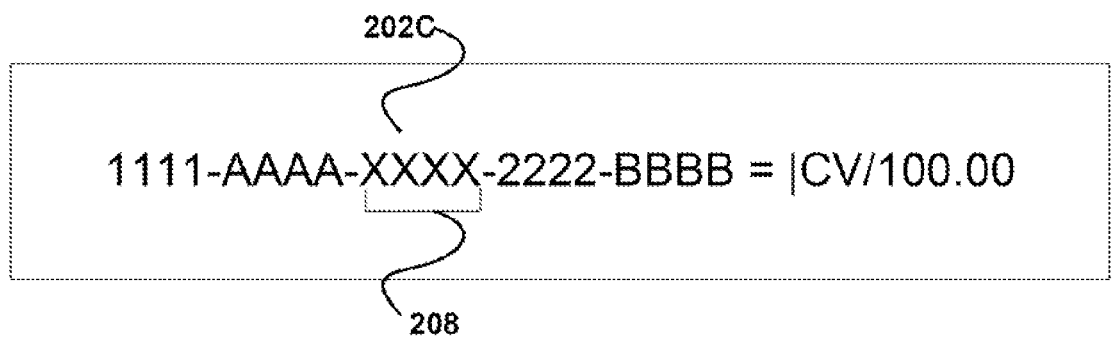
FIG. 3A shows a composite code utilizing a sequence of characters, in accordance with another illustrative embodiment.
Figure 3B:
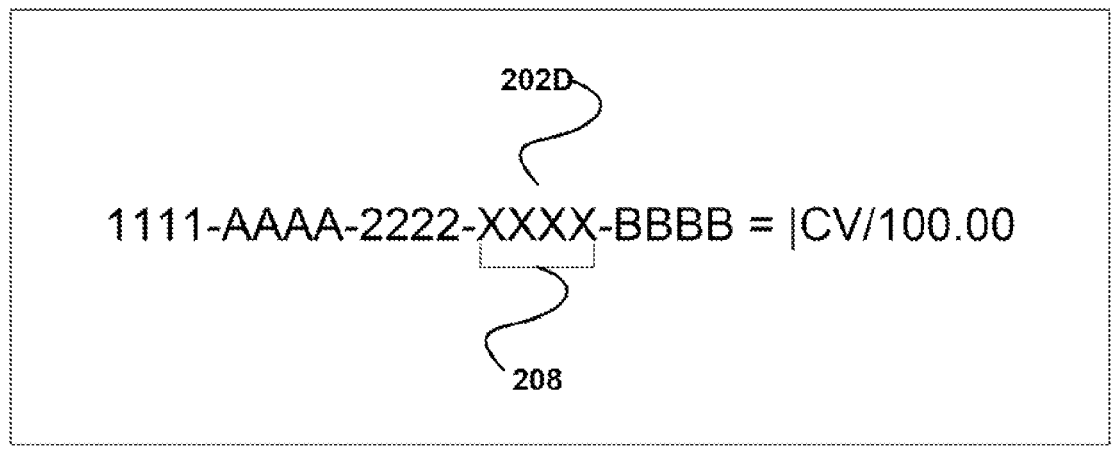
FIG. 3B shows a composite code utilizing a sequence of characters, in accordance with still another illustrative embodiment.

In one form, the PIN Code section 208 is in quintile 202E. In other embodiments, the user can optionally choose to have the PIN code section appear in other quintiles. For example, FIG. 3A shows the PIN-code section 208 at quintile 202C and FIG. 3B shows the PIN-code section 208 at quintile 202D. This allows for greater security and PIN code masking if the data or sequence is ever compromised.

The PIN code section is a security element of the composite code composite sequence. The PIN Code may be the same for all composite codes issued to a specified user, but need not be. Thus, when in an idle state, the composite code may be stored locally, or by a user, with the PIN code (or other section) omitted. Thus, if the composite code is ever compromised or data acquired, it is unusable.

In a preferred general approach of the general method, a portion of the composite code may be transmitted to at least one client, where the portion of the composite code does not include the security code. For example, the first code or a portion thereof may be sent to a user. For example, during the process of composite code generation/issuance, when composite codes are transmitted to the user, they may be transmitted with the PIN code section omitted. Thus, if a composite code is ever compromised in transit, it is unusable. As another option, the security code may be transmitted independently of the portion of the composite code to at least one client. As yet another option, the security code may be a user-selected code. Further, the security code may not be user-selected. For example, the security code may be created by a third party, assigned, computer generated, etc. Further still, the security code may be generated on the client side. This inherently secure architecture ensures a highly secure composite code generation/issuance process. The architecture may be made even more secure by implementing one or more optional strong security and authentication mechanisms.

In one embodiment, the predetermined currency value may be a maximum value that can be associated with the composite code for a remaining life of the composite code. This maximum value may be any currency value used for denoting a maximum limitation.

As another optional feature, which may improve security in some embodiments, the composite code may expire upon some event. For example, the composite code may expire when the currency amount is expended, when the user closes out an account, when the provider cancels, etc. In one approach, the composite code may never be reused when the composite code expires. For example, the composite code may be permanently retired when the composite code expires. In another approach, the composite code may not be reused after expiration thereof until a predetermined amount of time has elapsed after expiration thereof. In yet another approach, the composite code may not be reused after expiration thereof until an authorizing entity revives the composite code.

In a further preferred general approach of the general method, the composite code may be usable more than once, and the currency value associated with the composite code may change upon each use. For example, if a purchase is made utilizing the composite code, the amount of the purchase may be deducted from the composite code.

In another embodiment, the predetermined currency value may be a maximum value that can be associated with the composite code for a remaining life of the composite code. In yet another embodiment, the predetermined currency value may be a reducing currency value, such as for example, when used in conjunction with a reducing currency denomination code as described below.

In another approach, the composite code may not be able to increase in value post authorization. It may reduce from its original issuance amount, and is utilized until depletion. Following its use, the composite code composite sequence is invalid, and may be retired or otherwise expire.

In another preferred general approach of the general method, a computer program product comprising a computer useable medium having a computer readable program is presented. When executed on a computer, the computer readable program causes the computer to generate a first code. The first code may be any type of code, for example, alphabetic and/or numeric symbols, binary values, etc. and combinations thereof.

Additionally, the computer readable program causes the computer to embed a security code in the first code for creating a larger composite code. Further, the computer readable program causes the computer to associate the composite code with a predetermined currency value, the composite code being usable in a monetary transaction.

Reducing Currency Denomination Composite Code

The reducing currency denomination composite code is an example of one embodiment of a composite code and may comprise one preferred financial payment mechanism of the secure payment platform. The following will review some embodiments of the reducing currency denomination composite code in more detail, their underlying attributes, architecture, and key features. Reducing currency denomination composite code sub types, including the R-reducing currency denomination composite code and M-reducing currency denomination composite code, will also be disclosed.

In various approaches, the reducing currency denomination composite code may be utilized in credit based, defined asset based environments, or both, with strong benefits and usage in both areas. However, the reducing currency denomination composite code may be utilized in any environment.

The reducing currency denomination composite code is preferably a "predefined authorization value," and the creation of a reducing currency denomination composite code does not necessarily require immediate funding of the instrument.

While much of the following description will be described in terms of a reducing currency denomination composite code, it should be kept in mind that any of the composite codes described herein may be used substantially interchangeably therewith.

Reducing Currency Denomination Composite Code with Notation of Intended Use (e.g., R-Reducing Currency Denomination Composite Code)

In one general embodiment, the composite code may include a notation specifying an intended or authorized use of the composite code. For example, the composite code may include a notation specifying that the composite code is intended for use as a payment card for a particular purpose or vendor.

In a preferred general embodiment, a composite code structure corresponding to a currency value is presented. In use, the structure comprises a first code. The first code may be any type of code. For example, the first code may be one or more alphabetic and/or numeric symbols, binary values, etc. And combinations thereof. As in other embodiments, the structure may include a security code embedded in the first code thereby forming a composite code, where the composite code corresponds to a predetermined currency value. Furthermore, the composite code includes a notation specifying an intended use of the composite code.

In one embodiment, the notation may specify use for transactions of limited amounts of money. As an option, the notation and/or security code may contain unique identifying characteristics, such as an R in the code. As another option, the notation and/or security code may include a merchant identifier, e.g., sequence of characters associated with a particular merchant.

Figure 4:
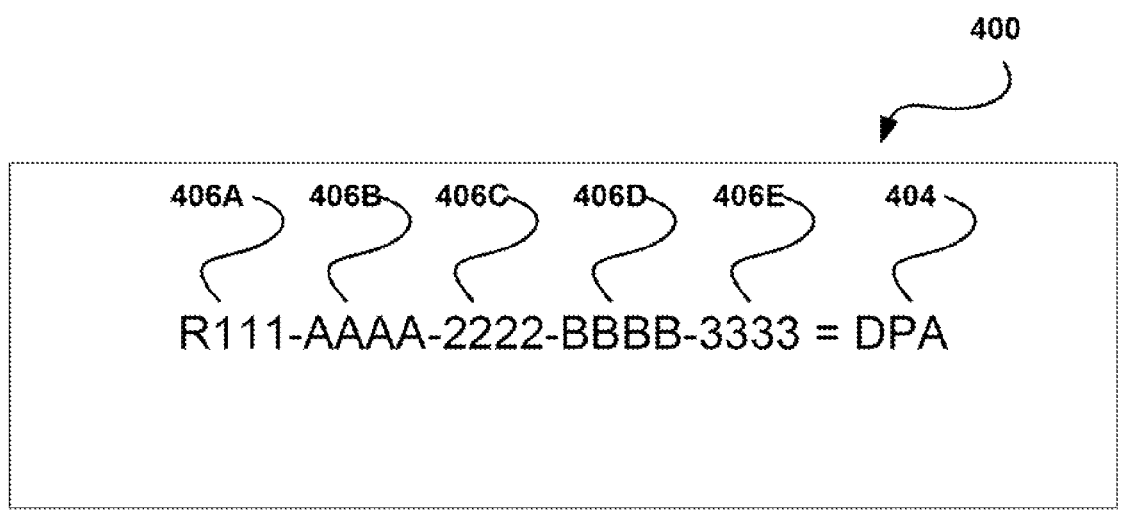
FIG. 4 shows an R-reducing currency denomination composite code, in accordance with one illustrative embodiment.

In one embodiment, the notation may specify use for a recurring billing transaction, such as a payment. Recurring billing transactions may include any data transaction that takes place over one or more recurring intervals. For example, the notation may specify for the composite code as an R-recurring currency denomination code. An example of an R-recurring currency denomination code 400 is shown in FIG. 4. As shown, the R-reducing currency denomination composite code 400 is a sequence of characters 402, corresponding to a defined payment amount 404. The R-reducing currency denomination composite code in this particular embodiment is comprised of quintiles 406A-E; however, the PIN Code section identifiers are not present. In other embodiments, a security code, such as a PIN Code section, can be implemented.

The first R-reducing currency denomination composite code quintile 406A is initiated with the character "R" signifying its targeted use. The quintiles may include a set of randomly generated and merchant-specified identifiers indicating various aspects of the merchant, user, and payment data. The fields may be customized and defined by an ordering merchant to ensure maximized key data, masking and security. The R-reducing currency denomination composite code 400 may be generated and stored in the merchant data base. Upon the recurring billing cycle, the R-reducing currency denomination composite code 400 is sent for authorization of the stated defined payment amount 404/interval amount. Upon authorization, a new R-reducing currency denomination composite code 400 is returned in its place, for use in the next billing cycle.

One strength of the R-reducing currency denomination composite code 400 is its underlying inherent security characteristics. In one embodiment, the R-reducing currency denomination composite code may be only valid for a specified payment, amount (fixed/variable), user, and merchant. Thus, if the data is ever compromised, it is inherently unusable. In cannot be utilized at other merchants, locations, or users, or for any other purpose. Thus, it is secure stored in the local merchant database, with minimal risk and client data exposure.

Micro-Payment Reducing Currency Denomination Composite Code (M-Reducing Currency Denomination Composite Code)

In one general embodiment, a composite code includes a first code, a security code, and a notation that specifies use for transactions of limited amounts of money. For instance, the composite code may include a notation specifying a maximum value that can be associated with the composite code. In another approach, the notation indicates a maximum value that can be exchanged in any given transaction. In yet another approach, the notation may contain unique identifying characteristics, such as for example, some type of sequentiality, a vendor code, a financial institution code, etc.

In one particularly preferred approach, the notation may specify the composite code as being an M-reducing currency denomination code. The M-reducing currency denomination composite code is a special use reducing currency denomination composite code sub-type, for use in micro-payment based transactions. Micro-payments are any payment of a small monetary value, for example, $100.00 United States Dollars (USD), $50, $25, $15, or $5 or less.

Figure 5:
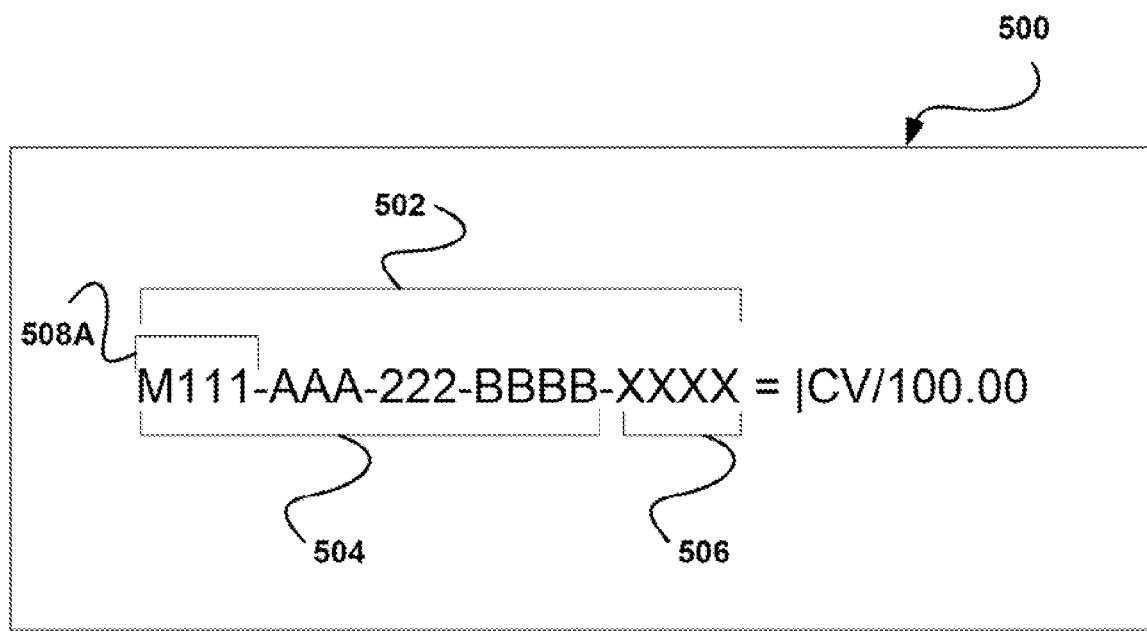
FIG. 5 shows an M-reducing currency denomination composite code, in accordance with one illustrative embodiment.

An illustrative M-reducing currency denomination code is shown in FIG. 5. As shown, the M-reducing currency denomination composite code 500 may include a sequence of characters 502, and shares the same underlying structure and sequence as a standard reducing currency denomination composite code. The reducing currency denomination composite code core 504 and PIN code 506 characteristics may be the same as described elsewhere herein. In addition, the user specified PIN code 506, and quintile location may be the same as the standard reducing currency denomination composite code for a stated user, while the PIN may be located in another quintile as an option. The first M-reducing currency denomination composite code quintile 508A is initiated with the character "M" signifying its targeted use.

In another preferred general approach, the M-reducing currency denomination composite code 500 may be used in micro-payments. The M-reducing currency denomination composite code 500 may be issued in smaller denominations, with a reduced maximum value (ex: $50.00 USD). In addition, the M-reducing currency denomination composite code 500 may only be utilized for limited value transactions (e.g. $15.00 USD or less). The maximum authorization amount and related parameters may be defined by a user, issuer, etc., and established upon M-reducing currency denomination composite code generation.

The M-reducing currency denomination composite code 500 addresses the disproportionate transactional risk exposure and transactional cost issues prevalent in current micro-payments. In minimizing the subsequent transactional use, and limited currency amount, disorientate risk issues are dramatically reduced, in addition, merchants may be charged reduced transactional fees (authorization/settlement) for M-reducing currency denomination composite code usage, addressing the issues of high proportional cost, margin reduction, and revenue impact prevalent in micro-payment transactions.

Illustrative System Architecture

Figure 7:
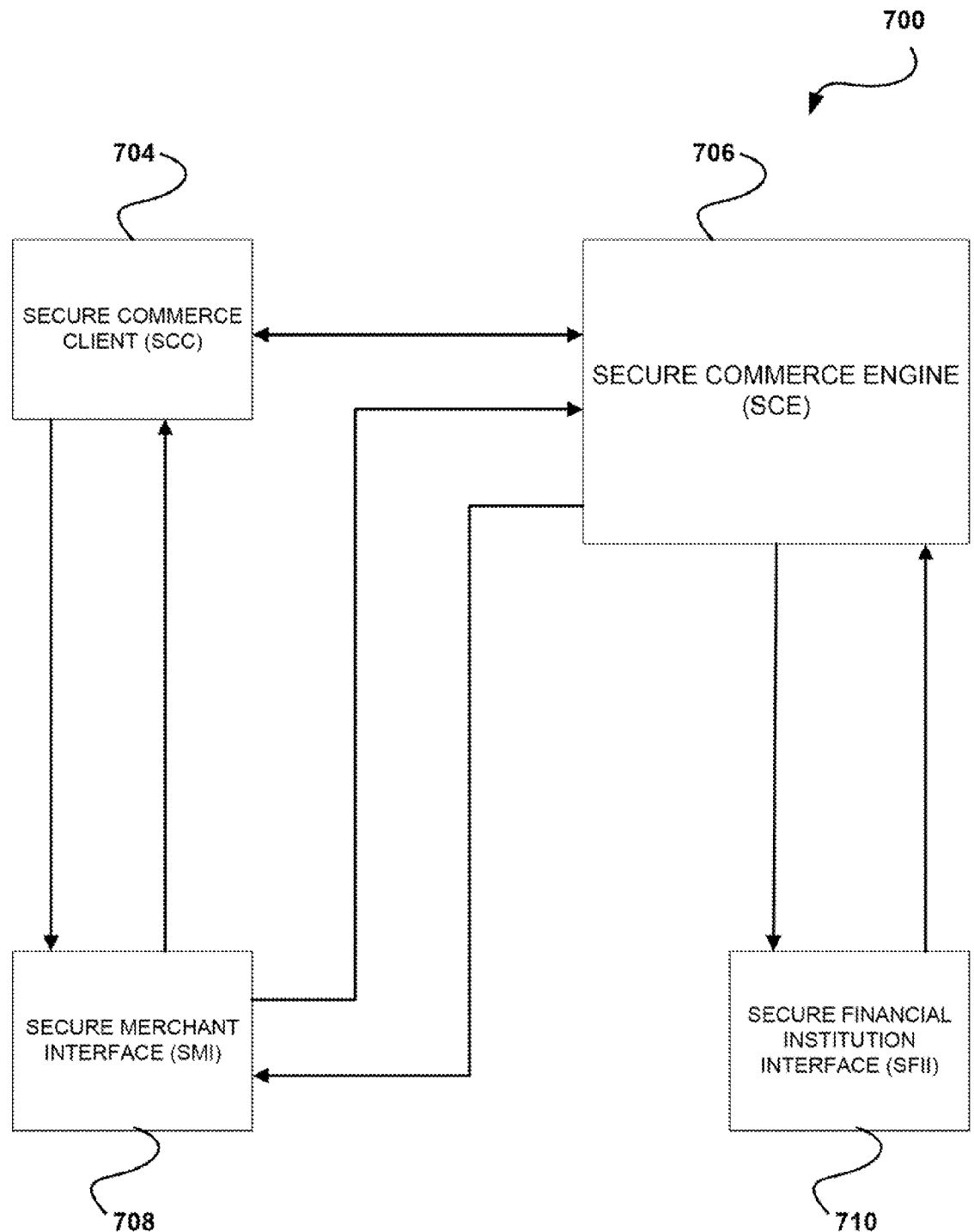
FIG. 7 illustrates a system architecture, in accordance with one preferred embodiment.

A system architecture according to one preferred embodiment, which may use a composite code, variations thereof or any other type of electronic currency, may be described generally with reference to FIG. 7. The secure payment platform (SPP) 700 is an inherently secure electronic payment platform, based on reducing currency denomination composite code technology, for performing secure electronic commerce transactions. Through the use of a new inherently secure payment methodology and platform, various embodiments of the SPP provide a revolutionary new platform to significantly reduce fraud, data theft, and identity theft, and/or ensure the key financial integrity of electronic payment transactions for user, merchants, and/or financial institutions.

The secure payment platform may be comprised of one or more components, and each may play a role in ensuring and facilitating the effective execution of all aspects and functions of the platform. It is important to note that the various embodiments described may include only one of the following components, a subset of the following components, or all of the following components, in addition to other additional components as well as combinations thereof.

Illustrative components of the SPP are described below, first in overview form, then in more detail. Preferred functionalities and features of each component are presented below. However, it should be noted and kept in mind that the disclosure of such functionalities and features is not meant to be exhaustive list of all possible functionalities and features that each component can provide. Further, in alternate embodiments, the components may provide fewer or different functionalities and features than those listed. Also, it should be appreciated that in some embodiments, various functions and features may be provided by components other than the particular component described below as providing that function or feature. Further, multiple components may be combined into a single component in some embodiments. Still further, each component or permutation thereof may stand alone as an independent embodiment.

Secure Commerce Client (SCC)

The secure commerce client 704, or SCC, is a client side interface to the secure payment platform. In one embodiment, the SCC 704 is installed locally on the user system, and is involved in several aspects and functions in the transaction, management, and general use processes of the SPP 700.

Secure Commerce Engine (SCE)

The secure commerce engine 706, or SCE, is the processing engine for the secure payment platform. The roles of reducing currency denomination composite code generation/issuance, transactional processing, authentication/validation (user/reducing currency denomination composite code), reducing currency denomination composite code lifecycle management, and/or key security and analytical processes may alt occur in the SCE 706.

Secure SecTransact Merchant Interface (SMI)

The secure sectransact merchant interface 708 is the merchant side interface to the secure payment platform. The SMI 708 enables a set of merchant driven functions including secure reducing currency denomination composite code transactional processing (authorization/settlement), data collection, recurring billing execution, secure data shielding/retention processes, and secure IP based pipelines into the SCE 706, and financial institutions (see description of SFII 710 below). The SMI additionally ensures secure communication between the merchant and the SCE 706, and additionally with the financial institution, SFII 710, Secure Financial Institution Interface (SFII)

The secure financial institution interface 710, or SFII, is the financial institution side interface and integrated user and merchant financial component of the secure payment platform. Integrating critical functionality of correlated financial data, client account, merchant account and related transactional settlement and correlation, the SFII 710 is the FI side application for both user and merchant account. The SFII 710 performs multiple roles for both reducing currency denomination composite code transactions on the credit, and defined asset clients of the related financial institutions, including fund authorization, settlement, and highly secure generated reducing currency denomination composite code delivery.

Secure Commerce Client (SCC)

The Secure commerce client (SCC) is one example of a user side interface and application for the secure payment platform. The SCC may be installed on the user system or any other system involved in the SPP.

In one embodiment, the SCC may comprise one or more of the following components, and/or others:
  GUI Interface
  Local Open DataBase Connectivity Database (ODBC DB)
  Digital ID/Key
  Registration Components
  Local Security/Authentication Layers A unique and specific SCC may be created for each new user, and may be installed via any means, for example secure download via the SCE or SFII, via single use CD-ROM or other medium, etc. Some features of the SCC may include a unique application number and a user-specific digital ID.

Figure 6:
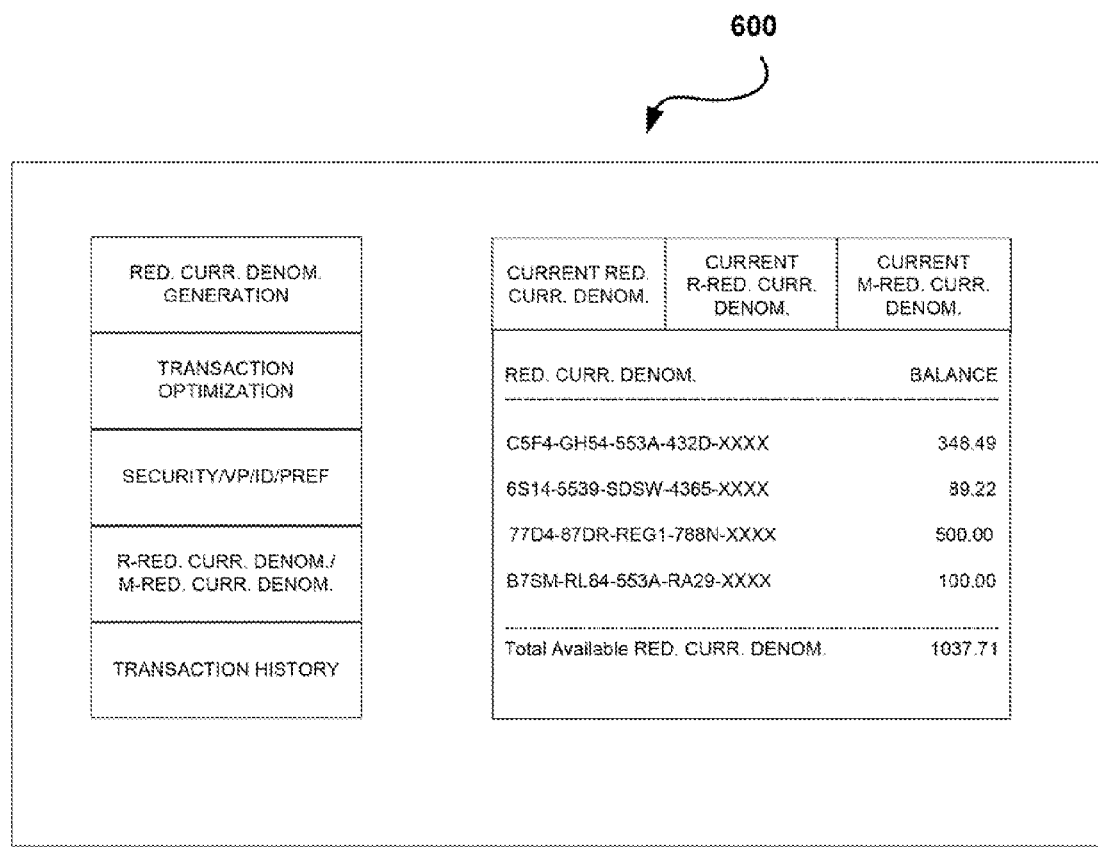
FIG. 6 is an example of a GUI interface in accordance with one illustrative embodiment.

Each component of the SCC may play a role in both the transactional and management processes of the SPP. The SCC may facilitate several user functions in the SPP, such as:
  Reducing currency denomination composite code generation/issuance
    Generating new reducing currency denomination composite codes for use, via a secure IP-based issuance process.
  Localized reducing currency denomination composite code management
    Management of current users reducing currency denomination composite codes, R-reducing currency denomination composite code, and M-reducing currency denomination composite code. All reducing currency denomination composite codes are preferably stored with PIN Code section omitted (quintiles omitted for R-reducing currency denomination composite code)
  Reducing currency denomination composite code transactional optimization
    Automated optimal use of user's current available reducing currency denomination composite codes, based on transaction amount and current available reducing currency denomination composite codes/balances.
  R-reducing currency denomination composite code issuance/management
    R-reducing currency denomination composite code initial creation, setup, and subsequent transactional updates
  User preference/setting administration
    User preference settings and controls. Settings may be synchronized with the SCE and SFII for usage.
  M-reducing currency denomination composite code issuance/management
    Key parameter settings and subsequent generation/issuance of M-reducing currency denomination, composite codes.
  Reducing currency denomination composite code retire processing
    Elimination, and cancellation/return of low residual value reducing currency denomination composite codes
  Transactional/historical data management
    Local storage of transactional data and historical usage. Critical data parameters omitted, with TransactionID files stored for greater security.
  Synchronization Features
    Synchronization with secondary devices, Mobile SCC, and smart card, and future peripheral devices and applications The SCC 704 may include any sort of user interface, for example, a GUI interface 600, as shown in FIG. 6.

With continued reference to FIG. 7, upon installation, the SCC 704 may automatically capture and register one or more key user data points to ensure effective user identification and security. The digital ID may comprise these points, as well as any other data representing a user, e.g., a digital certificate, an account number, a PIN or other security sequence, etc. The SCC 704 may register the digital ID to both the user and the serial ID of the system. The serial ID may be any form of identification of a user device. For example, the serial ID may be obtained from the processor ID on the CPU. A different digital ID may be issued to a new system of the same user, thus a single digital ID may be correlated to a single system. As an option, the SCC mobile application may be synchronized to the existing system, with the digital ID shared. However, the serial ID and related information of the mobile device may be additionally correlated to the digital ID to ensure security.

One use of the digital ID and serial ID is in the reducing currency denomination composite code generation and/or transmittal functions. Additionally, the digital ID may be used as secondary authorization criteria when requested by the merchant for higher value transactions.

Mobile Secure Commerce Client (Mobile SCC)

To ensure for both the portability and mobility of the reducing currency denomination composite code and reducing currency denomination composite code generation functions, and to enable mobile commerce, a mobile integration of the SCC may be performed. The mobile secure commerce client, or mobile SCC, is a mobile device based version of the SCC. The mobile SCC performs many of the key aspects and functions of the SCC, while altering certain functions to ensure effective mobile use.

The Mobile SCC may contain one or more of the following components, and/or others;
  GUI Interface
  Reduced Local DB functionality
  Digital ID
  Local Authentication Layers The Mobile SCC also allows for one or more of the following functions, and/or others:
  Reducing currency denomination composite code generation/issuance
  Localized reducing currency denomination composite code management
  Reducing currency denomination composite code inventory management
  Transactional optimization M-reducing currency denomination composite code generation/issuance The mobile SCC preferably supports one or more major mobile platforms, for example, Windows Mobile, the Symbian OS 9.3, additional Linux platforms, and all other existing and future mobile platforms.

Similar to the SCC, each installation of the mobile SCC may be user specified. Each mobile SCC installation and application may have an application specific ID associated with it. The digital ID for the Mobile SCC may be the same as for the user's primary SCC. The user may choose one primary system to synchronize with the mobile SCC.

Upon installation, the mobile SCC may capture key data points of the mobile device, including the serial ID. The user may then synchronize the device with the primary SCC for activation. During the synchronization process, the mobile SCC captures the digital ID from the device, and store it locally on the mobile SCC. The SCC also captures the application ID from the mobile SCC, and sends it to the secure commerce engine and/or the SFII for activation.

Secure Commerce Engine (SCE)

The secure commerce engine, or SCE, is one example of a component that may be involved in the operation of the secure payment platform. The SCE may be housed in any area of the secure payment platform, for example, the secure data center. Further, the SCE may be housed in a highly secure layered setting, with a combination of secure physical and digital instruction prevention and security layers.

The SCE provides several functions in the secure payment platform. The functions performed in the SCE may include one or more of the following, and/or other's:

Reducing currency denomination composite code generation/issuance
Transactional processing/routing
Reducing currency denomination composite code lifecycle management
Digital ID verification
Authentication/validation
Decision-making systems/secure analytics
Secure/masked user preference settings
Reducing currency denomination composite code archiving/storage Secure User Identifier (UI)

While the SCE is preferably included in the secure payment platform, the system may further include several data points to address the issue of client data protection. This may be facilitated through the use of a secure user identifier, or UI. In some embodiments, the UI is the primary mechanism by which all users of the secure system are identified, tracked, and executed within the SCE, it may be the primary user identifier and is passed between the SCE and the SFII. One reason, for this is that it allows for semi-anonymous communication between the SCE and the financial institutions via the SFII, and ensures that the client information and key account data (which can be vulnerable and damaging if compromised) are not passed, between the SCE and SFII.

In one embodiment the UI may be stored in the SCE for each user of the secure payment platform with one or more of the following parameters, and/or others:

Financial Institution
Credit/Defined Asset
User PIN Code/Quintile Setting
Active reducing currency denomination composite code's
Active R-reducing currency denomination composite code's/Settings
Active M-reducing currency denomination composite code's/Setting
Historical Transactions/reducing currency denomination composite code Usage
Digital ID
SCC Serial ID info The UI usage allows for anonymity during the exchange between the SCE and SFII, and further ensures account data security. The UI is correlated to an actual user account (credit/defined asset) on the financial institution side via the SFII. Upon registration with secure, a new UI request and resulting client settings may be sent via the SFII to the SCE. A new UI and user profile may then be created, and the UI number may then be sent back to the SFII with the new digital ID and SCC application ID number. The SFII will then correlate the UI with the underlying account data, and then verification of this may be sent back to the SCE. The SCE will then activate the UI, and the UI and user will be ready for use. The new SCC may then be created and will be ready to be sent to the user via the appropriate channel for installation. Upon installation, the underlying user system data, and serial ID information may be sent to the SCE for recording. The reducing currency denomination composite code Generation/Issuance function process may then be activated, and enabled for use for the specified UI.

Secure Merchant Identifier Interface (MI)

As another example, similar to the UI, there may be an additional unique secure identifier for a specific merchant and related data held within the SCE. The secure merchant identifier interface, or MI, specifies merchant account and financial institution information. The stated merchant may be held within the SCE as the secure merchant identifier, or MI.

The MI functions in much the same way as the UI with respect to its account shielding capacities and related FI/SFII correlation capabilities. When, a transaction is initiated, e.g. for a reducing currency denomination, composite code authorization or settlement (or related R-reducing currency denomination composite code, or M-reducing currency denomination composite code transactions from the secure merchant interface) it is sent to the SCE with a stated MI. The MI data is then used to properly and effectively handle the stated request, and process it correctly to the stated SFII.

The MI may be stored in the SCE for each merchant in the secure payment platform with one or more of the following parameters, and/or others:

Financial Institution
Historical Transactions.
IP/Security Related Merchant/Server Data.
SMI Application Identifiers The SCE may function as an identification and verification point for reducing currency denomination composite code payment transactions, and reducing currency denomination composite code generations within the SCE. The SCE may also serve as a data storage system, and provide for several functions with relation to analytic screening, as well as decision-making system and analysis. Within the SCE, the reducing currency denomination composite code screen application acts as the central secure analytical and screening filter for all reducing currency denomination composite code related transactions. The reducing currency denomination composite code screen allows for screening of data parameters and patterns of related reducing currency denomination composite code transactions, and transactions from a specified UI.

The reducing currency denomination composite code screen may be a network based application, for example a neural-network based application, which screens one or more key data points including, but not limited to:

Transaction velocity
IP origination.

Historical usage patterns
UI/reducing currency denomination composite code correlation
Reducing currency denomination composite code generation velocity
Merchant/reducing currency denomination composite code/UI correlation
Geolocation
Rapid preference/pattern changes If certain patterns and issues are seen, the reducing currency denomination composite code screen may block a requested authorization and transaction and notify the merchant of the issue.

The reducing currency denomination composite code screen and its resulting neural-network based system will increase its effectiveness and knowledge base with resulting transactional activity. In addition, it may be fine-tuned to effectively filter fraudulent transactions, while eliminating and minimizing false positive issues. The reducing currency denomination composite code screen allows for an additional strong layer of transactional security for all reducing currency denomination composite code based payment transactions.

Secure Financial Institution Interface (SFII)

The Secure Financial Institution Interface, or SFII, is an interface for the financial institutions and the secure payment platform. The SFII allows for secure direct communication with the SCE, and secure merchant interface (SMI).

The SFII may be located as a component of the FI of the SPP. The SFII may perform one or more of the following functions of the secure payment platform, and/or others:
 Reducing currency denomination composite code user/account correlation (credit/defined asset)
 Financial authorization/settlement
 Merchant account management
 Financial transaction processing
 FI-Internal reducing currency denomination composite code management
 Historical FI reducing currency denomination composite code usage/issuance
 Secure generated reducing currency denomination composite code delivery (e.g., secure upload, vault packet, etc.)
 Reducing currency denomination composite code activation/validation (per SCE)

The SFII is a mechanism for financial authorization and settlement activities. All reducing currency denomination composite code fund authorization functions and account settlement requests may be routed to the SFII for processing. The SFII acts as the filter and internal user/merchant account screen for all incoming transactions. Per a stated UI and merchant identifier, the SFII processes the account correlation/matching and correct transactional request processes. It may be integrated into the related back end ERP and financial application systems of the FI.

The SFII may contain at least one or more of the following components, and/or others:
 Admin GUI Interface
 Local ODBC DB/Integrated DB
 Transactional Processing/Request Handler
 Vault packet Engine The vault packet system is a security module of the system, and helps provide enduring data integrity. The vault packet system is the secure generated reducing currency denomination composite code Delivery system, which ensures secure generated reducing currency denomination composite code delivery. The delivery of newly generated reducing currency denomination composite code's within the SPP to the user creates a security risk and fraud opportunity for data thieves looking to acquire the newly generated reducing currency denomination composite code data. While containing inherently secure attributes and in their structures, the reducing currency denomination composite code data still must be protected to ensure not only unauthorized use, but also the integrity of the data and the SCC/SCE/SFII relationship. The vault packet system addresses this risk.

The vault packet file, or vault packet, is a highly secure data delivery mechanism. The vault packet may be a potentially self-corrupting data delivery file for the secure delivery of reducing currency denomination composite code or related data. The vault packet file is generated in the SFII via the vault packet engine application. During the reducing currency denomination composite code generation process the new user generated reducing currency denomination composite code's (core structure) are placed into the vault packet for download/delivery to the user.

Upon its creation, the vault packet is encoded with a user specific digital ID identifier in structure, based upon the SCC/user request. The vault packet is downloaded into the SCC, and opened for access. The vault packet may have to be "unlocked"/authenticated via the user specified Digital ID to be accessed. If an event occurs, e.g. the user specified Digital ID is not present, the vault packet file may self-corrupt and become unusable. The underlying data may also be destroyed and corrupted, and notification of its unauthorized access sent back to the SCE/SFII for notification. This ensures no unauthorized access of the file and the underlying reducing currency denomination composite code data. It ensures the integrity of the reducing currency denomination composite code data, and the further security and integrity of the user/FI relationship.

Secure Merchant Interface (SMI)

The secure merchant interface, or SMI, is a merchant side interface to the secure payment platform. The SMI facilitates several functions and may acts as a primary merchant application for communication and interaction with the SCE and SFII. The SMI may be integrated into the internal back end ERP/e-commerce/billing systems, and front end web (web/app severs) facilitating applications.

The SMI may include of one or more of the following key components, and/or others:
 Admin GUI Interface
 Secure IP Communication Module
 Local ODBC DC Interface
 Data Collection/Request File Module
 Transaction ID Interface The functions performed in the SMI may include one or more of the following, and/or others:
 Reducing currency denomination composite code Transactional Management (Authorization/Settlement)
 R-reducing currency denomination composite code Management (Admin/Cycle Management)
 Merchant Initiated User/Digital ID Validation
 Historical Transaction Management
 Key data Shielding Operations The SMI helps facilitate the merchant payment transactions via the SCE and the SFII. As an aspect of this transactional process, the SMI may incorporate many merchant security functions to ensure enduring protection of critical data prior to and after the transaction. A resulting security function of the SMI is the reducing currency denomination composite code data shielding function. During the transaction process, the reducing currency denomination composite code/M-reducing currency denomination composite code data is sent to the SCE for authorization. Following the authorization, a unique transaction ID file is returned to the merchant, which may contain a transaction ID number, related tracking storing data, and the first three quintiles of the reducing currency denomination composite code/reducing currency denomination composite codes used. The entire reducing currency denomination composite code string is never given to the merchant for storage.

As an additional measure of security, The SMI may allow for the gathering of the imputed reducing currency denomination composite code and transactional data from the front end application, and may subsequently send the data directly to the SME for processing. As a security measure, however, the data may be "shielded" from the merchant, and a security mechanism may be integrated which does not allow for the capture and storage of any pre-authorization data. The reducing currency denomination composite code data shielding function ensures the integrity and security of the data, while still providing the merchant with effective detailed data and tools to properly address transaction reconciliation, while minimizing the internal needs and security risks posed by sensitive data storage.

One benefit of the reducing currency denomination composite code data shielding application and resulting transactional security measurements is the minimization of the critical issue of merchant data mishandling. A large portion of compromised financial data and related compromised payment information often is a result of poorly handled data and inadequate security measures taken by the merchants. For example, transactional data may be placed on an unsecured server, or in a location reachable by many of the today's current search engines and data capturing applications. Thus a resulting network search will capture all of the key personal, financial, and transactional data of a customer subset from the merchants. This mishandling creates a major issue for both the users and the merchants. This issue may be strongly and effectively addressed through, both the reducing currency denomination composite code shielding and transactional security functions.

Transaction Flow—Overview

The secure payment platform provides an inherently secure platform and methodology for conducting electronic payment transactions. The system further allows for strong and secure transactions, while providing an intuitive and fluid transaction flow process. The following section will describe in detail one illustrative process and architecture related to the transaction types in the SPP: direct reducing currency denomination composite code payment transaction, standard reducing currency denomination composite code generation/issuance. R-reducing currency denomination composite code generation/transaction cycles, and M-reducing currency denomination composite code transactions generation/issuance.

Direct Reducing Currency Denomination Composite Code Payment Transactions

The direct reducing currency denomination composite code payment transaction is one example of a user initiated payment transaction in the SPP. The direct reducing currency denomination composite code transaction may occur in a traditional user-merchant payment interaction, for example, when paying for a single purchase of goods or services, in a preferred general method of the invention, a method for performing a monetary transaction is presented. In use, a first code is output. Additionally, a security code is received. Further, the security code is combined with the first code for creating a composite code, where the composite code is pre-associated with a predetermined currency value.

Further still, the composite code is submitted to a third party system. Optionally, any possible mechanism of submission may be used and the third party system may include any system capable of receiving the composite code. For example, the composite code may be submitted online to a third party server, submitted at a point of sale from a user device or item to a merchant device, entered manually into a merchant device, etc.

In another preferred, general approach of the general, method, multiple first codes may be presented, and a user selection of at least one of the first codes may be received. In one embodiment, multiple first codes may be presented, and at least one of the first codes may be selected based on currency values associated with composite codes containing the first codes. For example, a first code being associated with a smallest currency value may be selected first. Further, multiple codes may be selected, combined with the security code, and submitted to the third party. Additionally, a digital identifier may be sent to the third party system.

Figure 8:
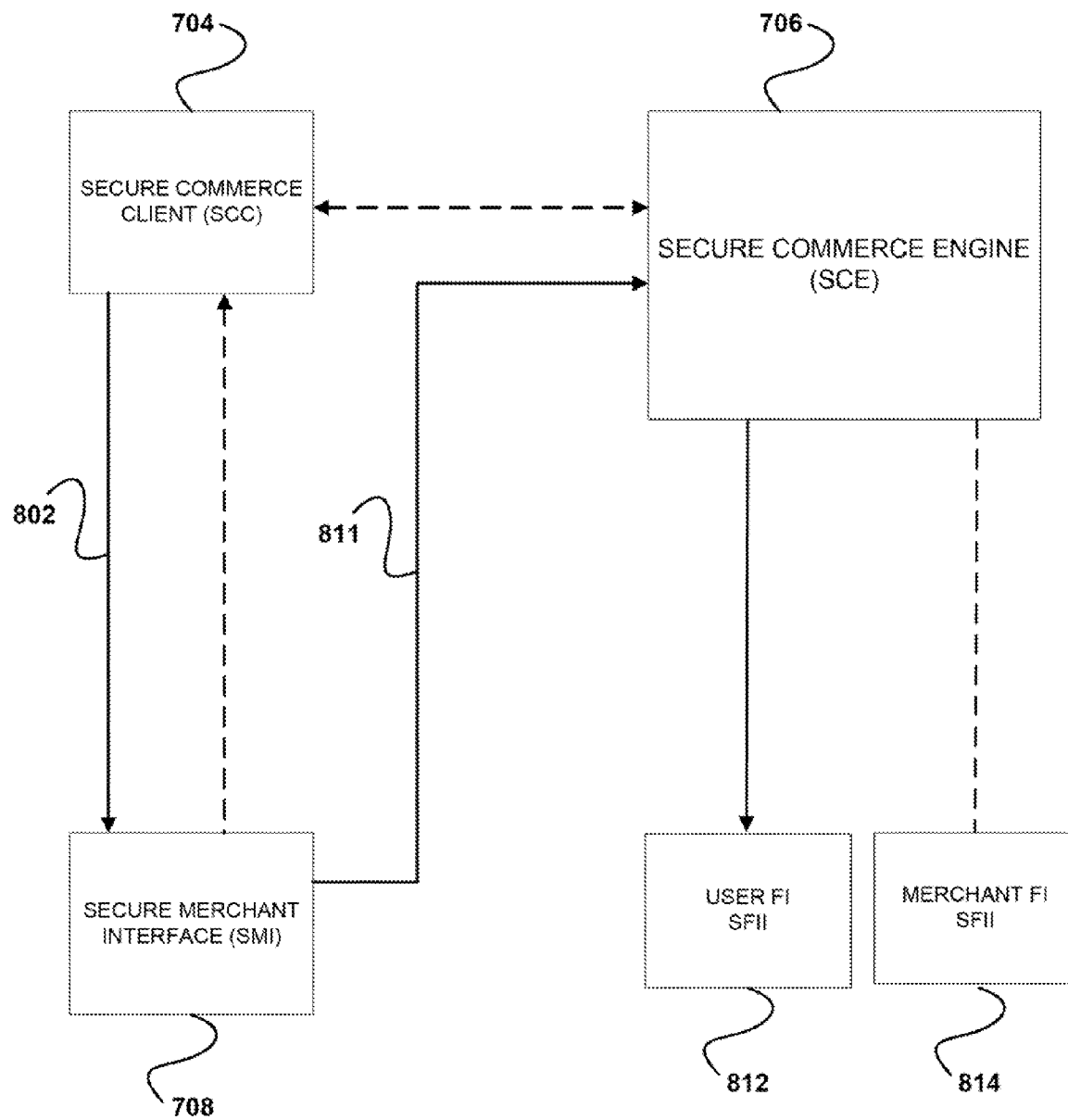
FIG. 8 shows a direct payment transaction, in accordance with one illustrative embodiment.

FIG. 8 shows another preferred general approach of the general method. As shown in operation 802, upon checkout the user enters the required information and necessary reducing currency denomination composite codes to satisfy the stated payment amount. The following user fields may be entered:

User name
Billing address
Shipping address (correlation purposes)
Reducing currency denomination composite code composite data The information may be manually entered if desired by the user. However, integrated into the SCC 704 may be information autocomplete and reducing currency denomination composite code optimization features. In the information autocomplete feature, user billing data and shipping data (multiple) are encrypted, and stored in the SCC 704 for use. If selected, the info autocomplete can automatically populate the billing and shipping fields for the user, thereby streamlining the payment transaction.

In one embodiment, upon checkout, the user may access the reducing currency denomination composite code optimization feature. Preferably, the feature may be accessed at any time. As stated above, in one embodiment reducing currency denomination composite codes are stored in the SCC 704 with the PIN code section omitted. The user would first enter the required payment amount, which is received. The user also enters the stated PIN code section field, which is received. The reducing currency denomination composite code optimization feature then automatically selects the optimal user of the current remaining reducing currency denomination composite code, populates the PIN fields, and enters the reducing currency denomination composite code composite data in the data field on the transactional checkout page. The reducing currency denomination composite code optimization feature may prioritize the usage of the current active reducing currency denomination composite codes based on a completion preference. Thus, lower residual balance reducing currency denomination composite codes may be accessed first, to complete their usage, with higher remaining balances access following (M-reducing currency denomination composite codes may be excluded).

For example, if a stated user had two reducing currency denomination composite codes, one with a $34.22 value remaining value, and a second with a $500.00 value, and a $124.39 transaction was required, the feature would first utilize the $34.22 and then a portion of the $500.00 for completion of the transaction. Additional screening may also be built into the feature to address multi-transaction, and more advanced scenarios. One result of the feature, however, would be the rapid use of remaining reducing currency denomination composite codes and reduced transactional risk exposure for the remaining active reducing currency denomination composite codes in the system.

In addition, during the checkout process, the merchant may demand the digital ID of the stated user for authentication purposes. This would likely be required by merchants in larger value transactions. If required, the digital ID may be sent via the SCC 704 to the SCE 706 via an SMI 708 initiated request. The SMI 708 then sends a request to the SCC 704 that the digital ID is to be verified by the SCE 706, with a special digital ID request identifier. Upon initiating the authorization, the SMI 708 sends the SCE 706 the required authorization data, with a digital ID request identifier. The SCC 704 simultaneously sends the digital ID and related request identifier to the SCE 706 for authorization. The SMI 708 initiated transaction may then be authorized, and further, the digital ID request's successful completion may be verified. To address the issue of latency, and user-merchant data delivery discrepancies, the merchant may choose to initially authorize the transaction, yet not finalize a settlement until the digital ID verification is processed. The processes should occur in unison. However, the merchant may choose this aspect to address the fluid transactional process. In addition, a focus of this process is the secure validation, and protection of the user Digital ID.

Further, as shown in operation 811, The SMI 708 will then route these fields, and transactional data, via a secure IP-Based pipeline to the SCE 706, with the stated merchant identifier (MI), signifying the transaction. As discussed prior, the SMI 708 might not allow the merchant to capture the reducing currency denomination composite code data, and resulting data parameters.

The SCE 706 then validates the reducing currency denomination composite code composite sequences, and remaining stated values. Only the remaining reducing currency denomination composite code value is verified, not the asset/or credit availability. The financial based authorization occurs within the SFII. The reducing currency denomination composite code(s) are then correlated with the user UI and stated financial institution. The reducing currency denomination composite code composite and related additional data (user names, billing address data) are then sent to the user financial institution SFII 812 for further processing, and reducing currency denomination composite code fund authorization. Preferably, the merchant MI is held in the SCE 706 for subsequent processing and notification of the merchant, financial institution SFII 814.

Figure 9:
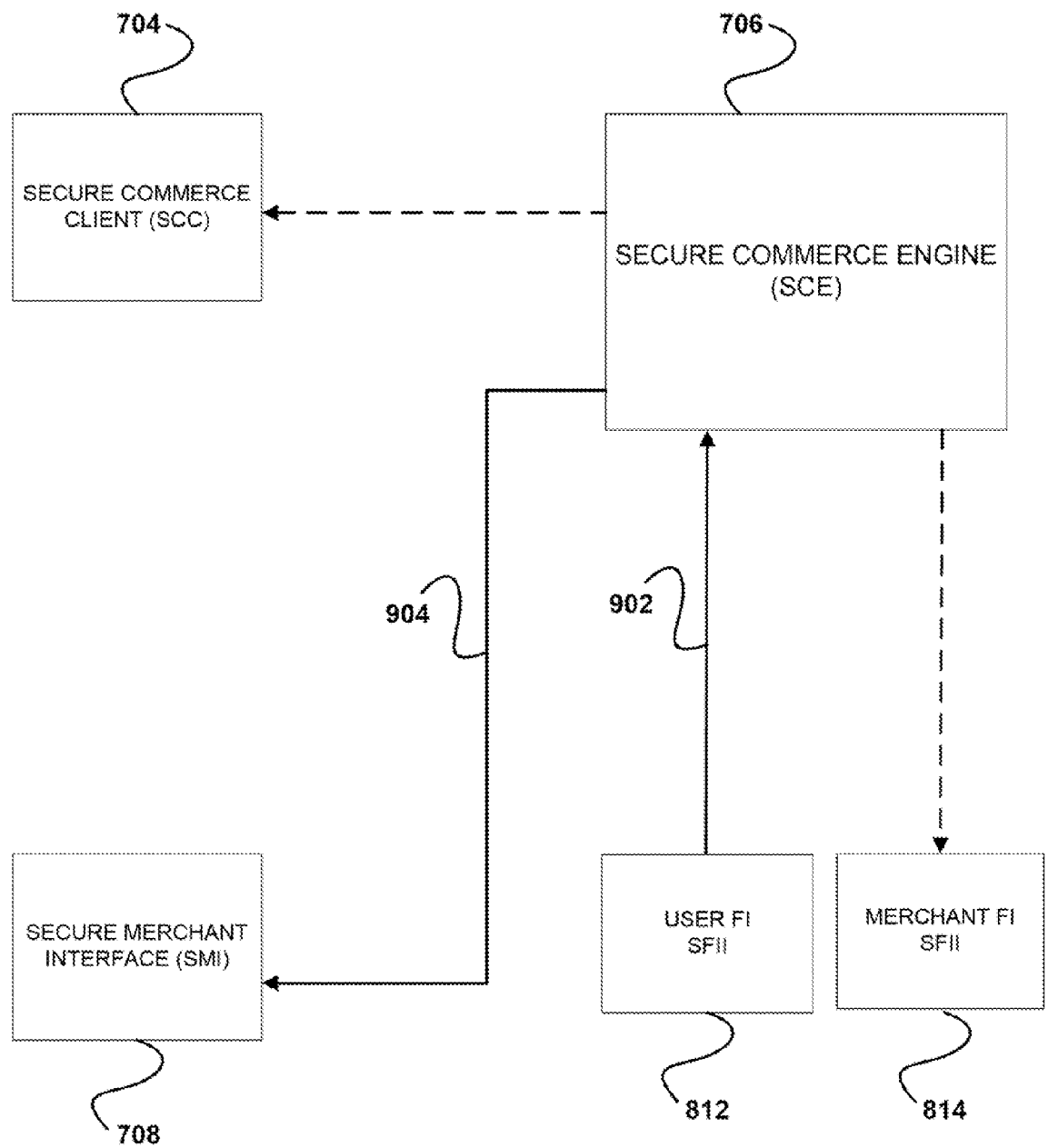
FIG. 9 shows a direct payment transaction, in accordance with yet another illustrative embodiment.

Another preferred general approach illustrating information flow is illustrated in FIG. 9. For example, in operation 902 the SFII captures the data and correlates the UI and reducing currency denomination composite codes with the stated user account. The user data and resulting billing address data is correlated against the listed name and address of the stated FI account, via the secure user data authentication feature. The user data authentication feature acts as an additional security measure and screen to ensure against unauthorized users of the stated reducing currency denomination composite codes. The feature may check against the FI DB, with the billing address, and user name. Additional misspelling and abbreviation filters may be added to ensure against a false positive rejection.

Upon authentication, the SFII verifies the fund (assets/credit limit) amount for the stated user. If sufficient assets, or credit availability are not present, the SFII declines the transaction, and may notify the SCE 706 for routing to the SMI 708, and user of this decline notice. The SCE 706 may initially only verify the value availability of the reducing currency denomination composite codes processed, and not capture the balances for use until fund authentication is received from the SFII, thus ensuring their future use upon account changes. If the funds are available, the SFII captures and locks up the funds, and then passes a valid fund authorization to the SCE 706.

As shown in operation 904, the SCE 706 may temporarily capture the reducing currency denomination composite code value balances. The SCE 706 may also create a stated transaction ID file for processing. The transaction ID file is the primary transaction identifier, and merchant utilized data mechanism for the processing, settlement, and transactional reconciliation within the SPP. The transaction ID file may contain one or more of the following components, and/or others:

Transaction ID number
First two quintiles of reducing currency denomination composite code/reducing currency denomination composite codes
Authorization Date/Time.
MI Data
Secondary Identifiers The Transaction ID file is then sent to the SMI 708 for storage. The SMI 708 captures and records the Transaction ID file data. All aspects of the transaction ID file can be stored by the merchant, and utilized in a specified way by the merchant and the back end ERP/billing systems. Notification of the authorized reducing currency denomination composite codes and updated value amounts will be sent to the user SCC 704 for updating, along with the transaction ID number (not the entire file string).

In addition, the transaction ID file will be sent to the SFII 814 of the stated merchant for recording and future settlement processing.

Figure 10:
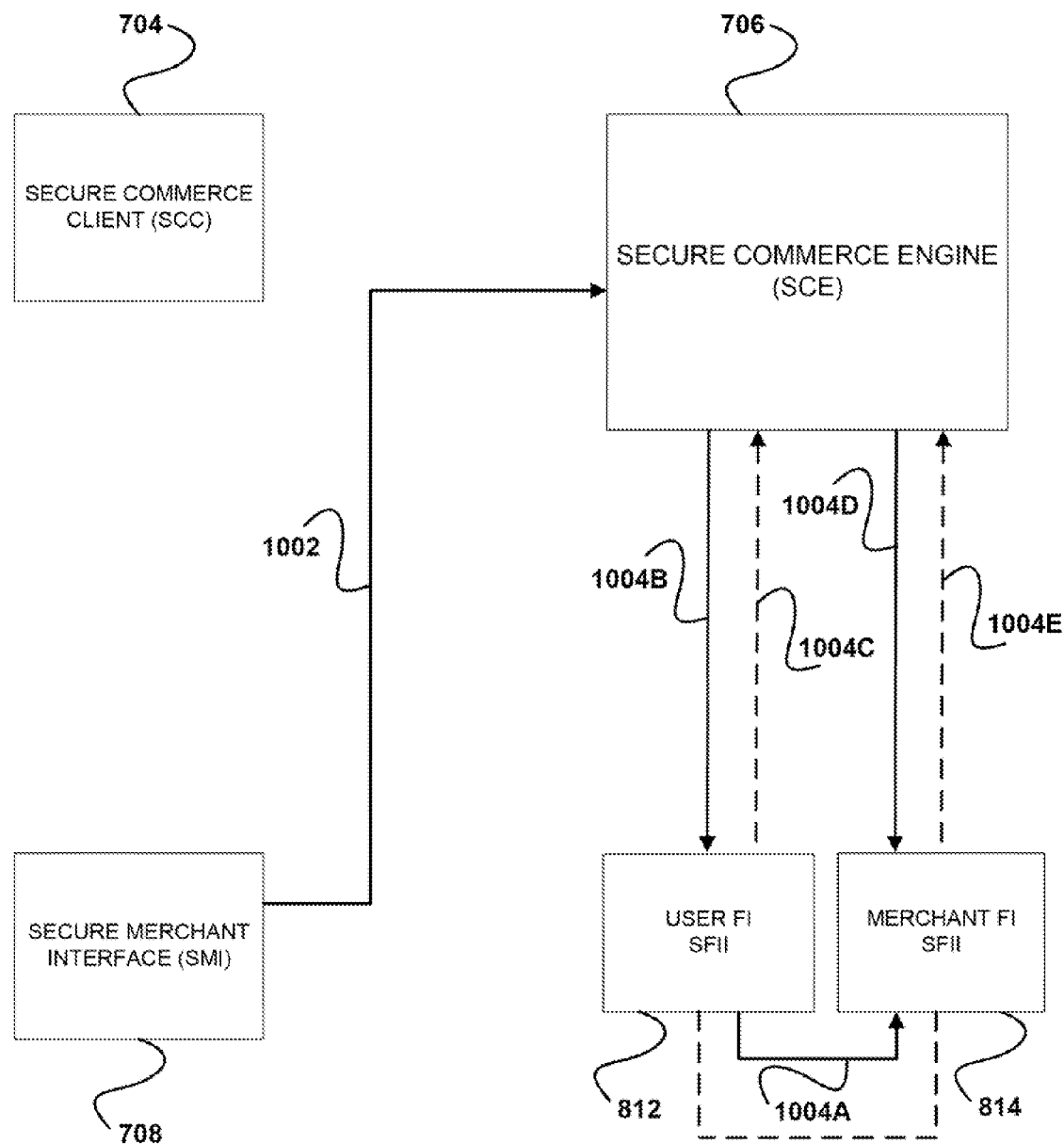
FIG. 10 shows a direct payment transaction, in accordance with still another illustrative embodiment.

Additionally, in another preferred general approach as illustrated in FIG. 10, the merchant may send the transaction ID file for settlement of the state transaction when all required parameters have been met. See operation 1002. The SCE 706 wilt capture the Transaction ID file and processes the settlement. The reducing currency denomination composite code utilized will have the value removed, and depleted reducing currency denomination composite codes will be retired. The settlement request and resulting Transaction ID file will then be sent to the SFII for the user (812) and the stated merchant (814) for processing. The transaction. ID file would be sent to the user SFII 812, with the request to settle the transaction and transfer funds to the merchant bank with the stated MI. The file would additionally be sent to the merchant bank, to anticipate funds coming in with the stated amount and UI.

Further, in operations 1004A-D the user bank and merchant bank process the settlement. The funds may be debited from any user account, e.g. the asset base/credit Amount of the user within the user merchant bank. The funds are then wired to the merchant bank and SFII with a secondary identifier to settle the funds into the stated merchant bank with account for the specific merchant, and the specific transaction ID. The transaction would then be processed. Final settlement notification would then be sent to the SCE 706, for final closure of the active transaction ID file. Notification would be additionally sent to the SCC 704 for updating current available SCC.

Standard Reducing Currency Denomination Composite Code Generation/Issuance

The standard reducing currency denomination composite code generation issuance transaction is an example of a process by which new user specified reducing currency denomination composite codes are created in the secure payment platform. Some methods for the generation/issuance of reducing currency denomination composite codes are the secure IP-based method, and the customer service interaction method. These methods and their underlying characteristics will be subsequently described.

Secure IP-Based Channel

The Secure IP-Based method is one method of reducing currency denomination composite code generation/issuance in the SPP. The SPP is a rapid and secure process whose inherently secure methodology and supporting applications and components ensure a fluid and secure reducing currency denomination composite code generation process. A preferred general method for generating a code associated with a currency value is presented. In use, a request is received from a user device for a code corresponding to a defined currency value. The user device may be any device associated with a particular person or entity, for example, a computer.

In addition, a determination may be made as to whether funds pertaining to the user and at least matching the defined currency value are available. Furthermore, a first code is generated or received. Also, a security code is embedded in the first code for creating a composite code. Additionally, the composite code is associated with the defined currency value. At least the first code is sent to the user device.

As an option, the first code may be sent to the user in a packet requiring unique authorization data to access the first code. For example, the first code may be sent to the user in a vault packet (described below). Also, the first code may be unusable to conduct a monetary transaction in any form except when combined with the security code to form the composite code.

Furthermore, the security code may be a user-selected code. Further still, an activation notice may be received from the user device, and it may be indicated that the composite code is available for use.

Figure 11:
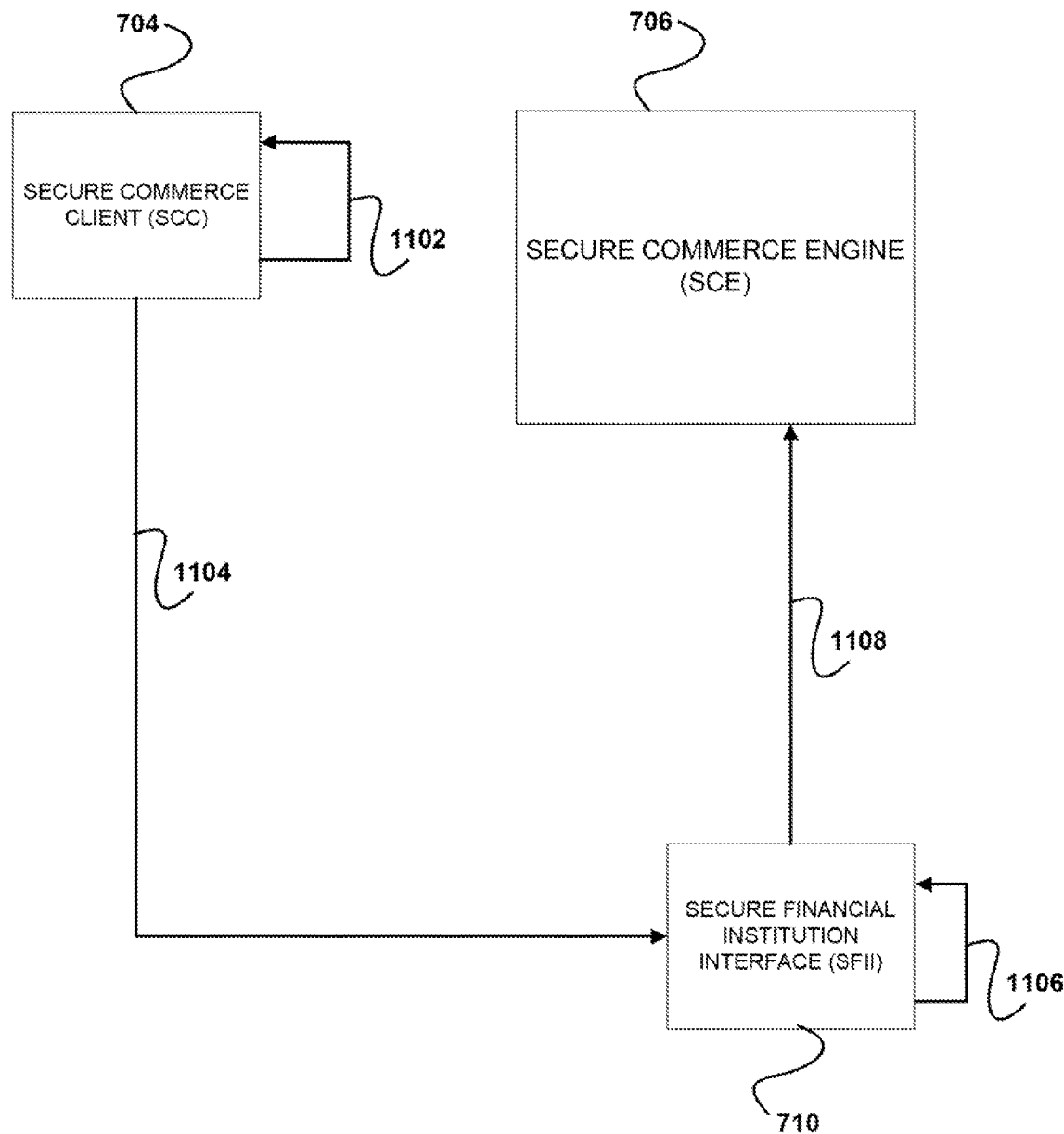
FIG. 11 shows a method for composite code generation and issuance in accordance with one illustrative embodiment.

In another preferred general approach of the general method, as illustrated in FIG. 11, a method for composite code generation and issuance occurs as follows.

In operation 1102, the user is granted access to the SCC 704 via a local password, and related layer of security. The reducing currency denomination composite code generation function is requested. A possible second password may be applied for an additional layer of security. For further security reasons, the local password may not be the same as the PIN quintile code for a stated user, and may contain a minimum number of characters, for example, seven characters.

Further, in operation 1104, the SSC receives the number and denomination/value of the requested reducing currency denomination composite code/reducing currency denomination composite codes. The SCC 704 then processes the requested reducing currency denomination composite code/reducing currency denomination composite codes and underlying amounts and sends them to the user FI SFII 710 for processing, with the user digital ID, serial ID (CPU), SCC application ID, and internal FI client ID data for initial validation.

In operation 1106, the SFII 710 then validates the requested, reducing currency denomination composite codes against a current user's account balance. The reducing currency denomination composite codes generated do not freeze, lock up, or require funding; however, upon generation, the underlying assets and credit limits may be required. In a defined asset environment, the reducing currency denomination composite code requested is generated against current account balance. In a credit based environment, the reducing currency denomination composite codes are validated against a current credit limit. However, the user FI 710 may potentially require in a credit based environment that the generated reducing currency denomination composite code reserve available credit limits.

In operation 1108, upon fund availability authorization, the reducing currency denomination composite code generation request is sent to the SCE 706. For the protection of vital user account information and data, the request sent to the SCE 706 may contain minimal information. Only the UI, and the requested reducing currency denomination composite code/reducing currency denomination composite codes' underlying values and amounts and user digital ID are sent to the SCE 706 for processing.

Figure 12:
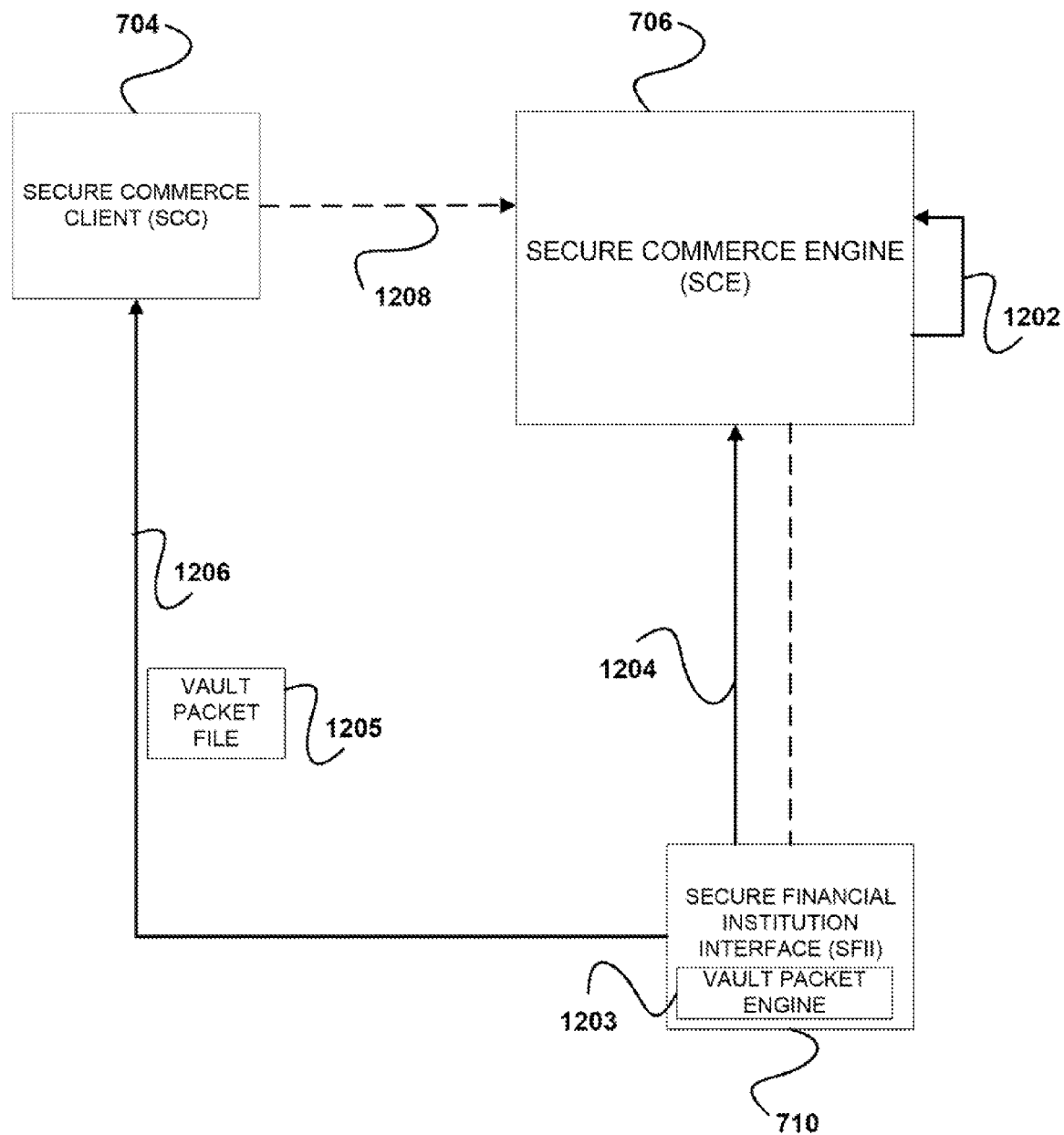
FIG. 12 shows a method for composite code generation and issuance in accordance with another illustrative embodiment.

As shown in FIG. 12, The SCE 706 authenticates the user digital ID and serial ID against the stated UI. See operation 1202. Upon validation, the SCE 706 then generates the complete reducing currency denomination composite code composite structure for each of the stated reducing currency denomination composite codes, based upon the PIN Code section and quintile location for the stated UI. The newly generated reducing currency denomination composite codes are then placed on a hold status with the SCE 706 pending activation. The final reducing currency denomination composite code core section, (reducing currency denomination composite code composite—PIN code) is then sent to the SFII 710 for secure transfer to the user.

In operation 1204, the SFII 710 then captures the new reducing currency denomination composite code core structures, and creates a new vault packet file via the vault packet engine 1203. A vault packet file may be any type of file, and may contain any amount and combination of data. For example, the vault packet file may be loaded with the new reducing currency denomination composite code core sequence, and corresponding values, and is encoded with the user specific digital ID lock for delivery.

In operation 1206, the new vault packet file 1205 is uploaded into the SCC 704 for access. The SCC 704 then accesses and opens the vault packet file for access to the new reducing currency denomination composite code core structures. If accessed improperly, with an incorrect user ID, the vault packet file will self corrupt, rendering the data useless. This is achieved via the only file process the vault packet file will allow initially, which is the validation executable. If any other process or additional data aspects of the file are accessed, the corruption sequence preferably is triggered and initiates the rendering of the data as useless. If correctly validated, the SCC 704 captures the new reducing currency denomination composite code core data, and places it into the reducing currency denomination composite code management application for further use.

In operation 1208 the SCC 704 will then send an activation notice to the SCE 706 for the stated reducing currency denomination composite codes which are newly generated. The SCE 706 activate the new reducing currency denomination composite codes and place them into the active reducing currency denomination composite code DB for current use. As an option, the SCE 706 may notify the SFII 710 of the reducing currency denomination composite code activation, and the newly generated reducing currency denomination composite codes will be ready to use. The mobile SCC application follows similar processes and procedures.

Vault Packet/Time Feature

Various embodiments provide mechanisms designed to increase security by attempting to ensure that only authorized users can access the data. The following embodiments, while described in terms of use with a composite code, may be used with any type of data.

Figure 13:
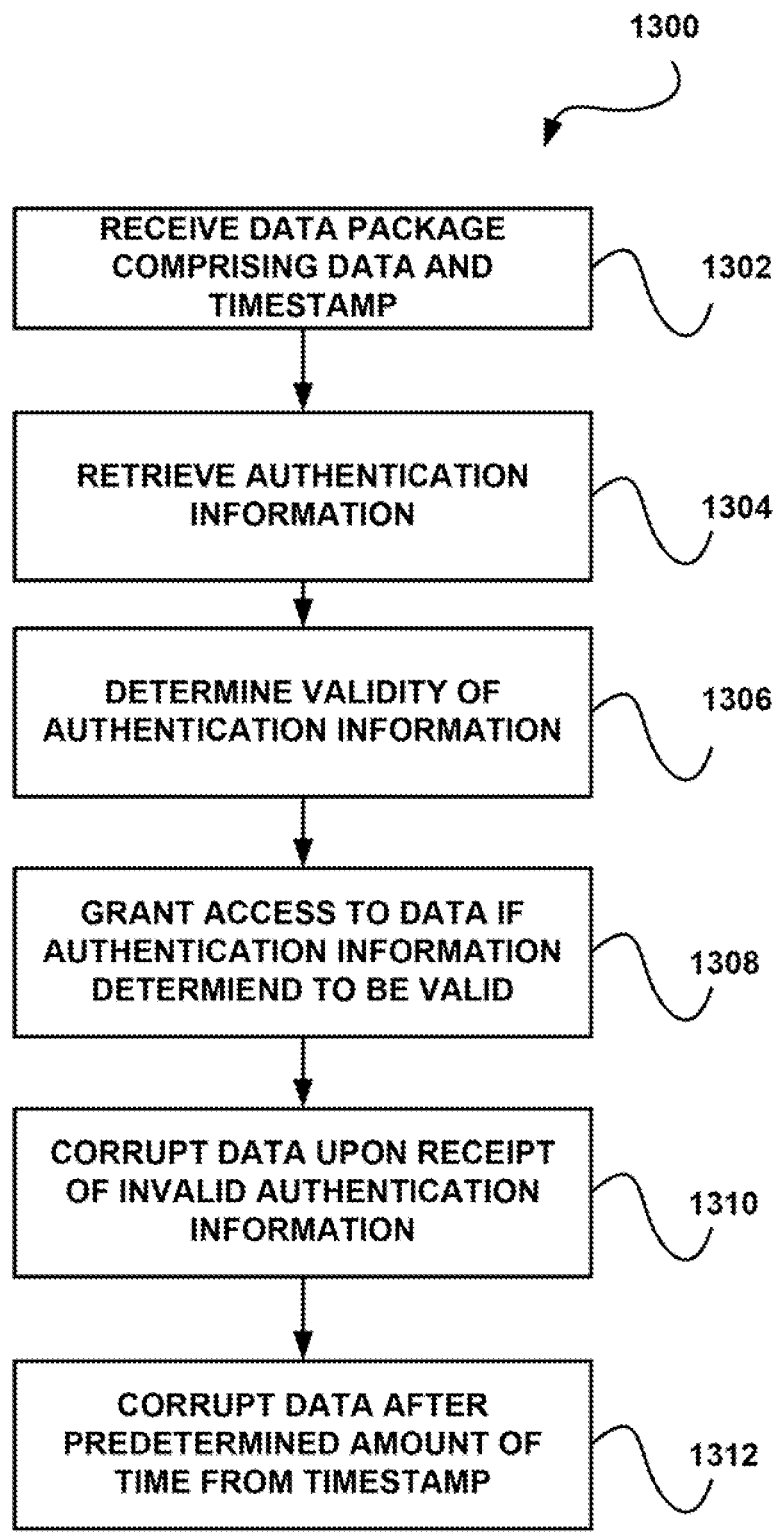
FIG. 13 shows a method for safeguarding data, in accordance with one illustrative embodiment.

A preferred general method 1300 for safeguarding data is shown in FIG. 13. As shown, in operation 1302, a data package comprising data and an optional timestamp is received. The data package may be received from any source capable of sending a data package. For example, the data package may be received from a remote system that generated the data package, from memory or storage, from a local program that generated the data package, etc.

In operation 1304 authentication information is received or retrieved. The authentication information may come from any source capable of sending authentication information, for example, a user, a system, etc.

In operation 1306 a validity of the authentication information is determined. In addition, access to the data is granted if the authentication information is determined to be valid. See operation 1308.

In operation 1310 the data is corrupted upon receipt of invalid authentication information. Corrupting the data may include any disabling of the data, such as, but not limited to, deletion of some or all of the data, addition of bits to render the data unreadable, scrambling of the data, etc.

In optional operation 1312 the data is corrupted after expiration of a predetermined amount of time from the timestamp.

In another preferred general approach of the general method, at least a portion of the data package is encrypted. Any type of data encryption may be used to encrypt the portion of the data package. For example, asymmetric key encryption, public key encryption, symmetric key encryption, or any other type of data encryption may be used. The encryption of at least a portion of the data package may be an optional feature in one or more embodiments, for example when the data package is transferred using a secure communications protocol, for example, Transport Layer Security (TLS), Secure Sockets Layer (SSL), Secure Shell (SSH), etc.

In yet another preferred general approach of the general method, the corrupting may occur whether or not proper authorization data is ultimately received if a predetermined amount of time has expired. As another option, the predetermined amount of time may be any amount of time. For example, the predetermined amount of time may be less than about one day, less than about one hour, less than about fifteen minutes, less than about five minutes, etc.

In another embodiment, the authentication information may include a unique identifier associated with a user's system. For example, the authentication information may include the processor serial number, a user-assigned or computer generated identification number assigned to the system in general, a serial number of a software program stored on the system, etc.

In another preferred general approach of the general method, the data is a portion of a composite code that is useable in a financial transaction upon addition of a security code thereto.

In one embodiment, the timestamp may correspond to about a time that the data package was generated. In another embodiment, the timestamp may correspond to about a time that the data package was sent by a sender.

In another embodiment, the data may be corrupted after expiration of a predetermined amount of time from the timestamp. The corruption may take place immediately upon expiration of the time period, upon an attempt to access the data at a later time, etc. This may occur even with the proper authentication information. The data may also be corrupted automatically if no access is made by the expiration of the predetermined amount of time.

In yet another embodiment, a notification relating to the corrupting the data to a third party may be sent to one of the system components.

In a further embodiment, a security code may be received. In addition, the security code may be added to the data to create the composite code. Further, the composite code may be output, for example to a local or remote system, such as, a merchant side machine, etc.

In yet another preferred general approach of the general method, a computer program product comprising computer usable code embodied on a computer readable medium is presented. In use, computer usable code provides access to a reducing currency denomination composite code upon receipt of valid access data, where the reducing currency denomination composite code is associated with a predetermined currency value. In addition, the reducing currency denomination composite code has a security code embedded therein. Further, computer usable code corrupts at least the reducing currency denomination composite code upon receipt of invalid access data.

In still another preferred general approach of the general method, a method for authorizing data is presented. In use, a data package comprising data is sent, where the data package requires valid authentication information for granting access to the data.

In addition, the data is corrupted if the authentication information is invalid. Furthermore, a confirmation that access to the data was successfully granted is received by one or more components of the system.

Additionally, a notation may be created that the data is authorized for further processing. This notation may be created anywhere in the overall system. Further processing may include any additionally processing of the data.

In another embodiment, further processing may include a monetary transaction. As another option, a notification relating to the corrupting the data to a third party may be sent.

In yet another embodiment, the data package may be generated. As another option, an executable for corrupting the data may be included in the data package. As yet another option, a timestamp may be included in the data package, wherein the data is corrupted after expiration of a predetermined, amount, of time from the timestamp.

In another preferred general approach of the general method, the vault packet may contain a time feature, which may be similar to the embodiments described above, or different. The time feature may be a time stamp, a countdown timer, or any other feature which records an aspect of time. Additionally, after a certain time has elapsed, the time feature may perform an operation.

For example, the new vault packet file may contain or correlate with a countdown timer with a predefined time limit in which the timer is started with the time limit upon the sending of the new vault packet file, and the secure contents of the new vault packet file are destroyed if the predetermined time limit expires. In another example, the vault packet file may contain a time stamp which notes the send time in which the vault packet file is sent. When the file is accessed by the user, the access time is noted. If the difference between the send time and the access time is greater than a predetermined time amount, the secure contents of the new vault packet file are destroyed.

Figure 14:
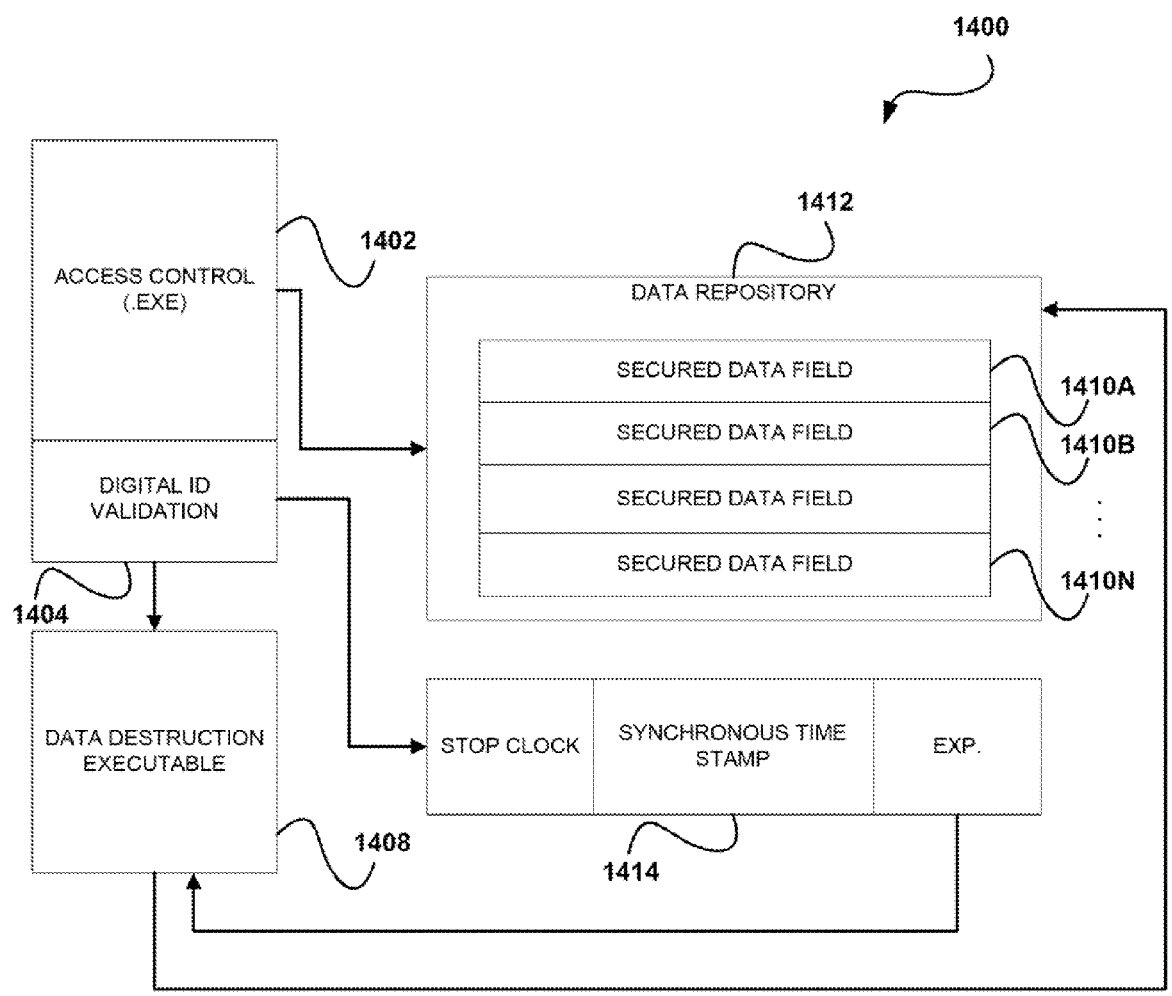
FIG. 14 shows an implementation of a vault packet file, in accordance with one illustrative embodiment.

In yet another preferred general approach, one illustrative embodiment of the use of a time feature is shown in FIG. 14. As shown, vault packet file 1400 comprises a synchronous time feature 1414.

Additionally, vault packet file 1400 further comprises an access control 1402 which is used to open the vault packet 1400. In addition, the access control 1402 performs a digital ID validation 1404 in order to determine whether the digital ID of the user matches the ID in the vault packet file 1400. Further, a data destruction module 1408 may automatically corrupt or delete the secure data 1410A-N found in the data repository 1412.

The date destruction module 1408 may proceed with the automatic corruption or deletion of the secure data 1410A-N in the data repository 1412 if one or more conditions are met. For example, the data destruction module 1408 may corrupt or delete data if the digital IDs do not match, if it is determined that an attempt has been made to access or tamper with portions of the vault packet file 1400 for which access permission has not been given, or for any other predetermined reason.

Furthermore, if the access control 1402 determines that the digital IDs do match, then it is determined by the synchronous time feature 1414 whether the access time limit has been exceeded. If the time limit has been exceeded, then the data destruction executable 1408 is triggered and the secure data 1410A-N in the data repository 1412 is corrupted or deleted. If the time limit has not yet been met, the synchronous time feature 1414 allows access to the data repository 1412.

Figure 15:
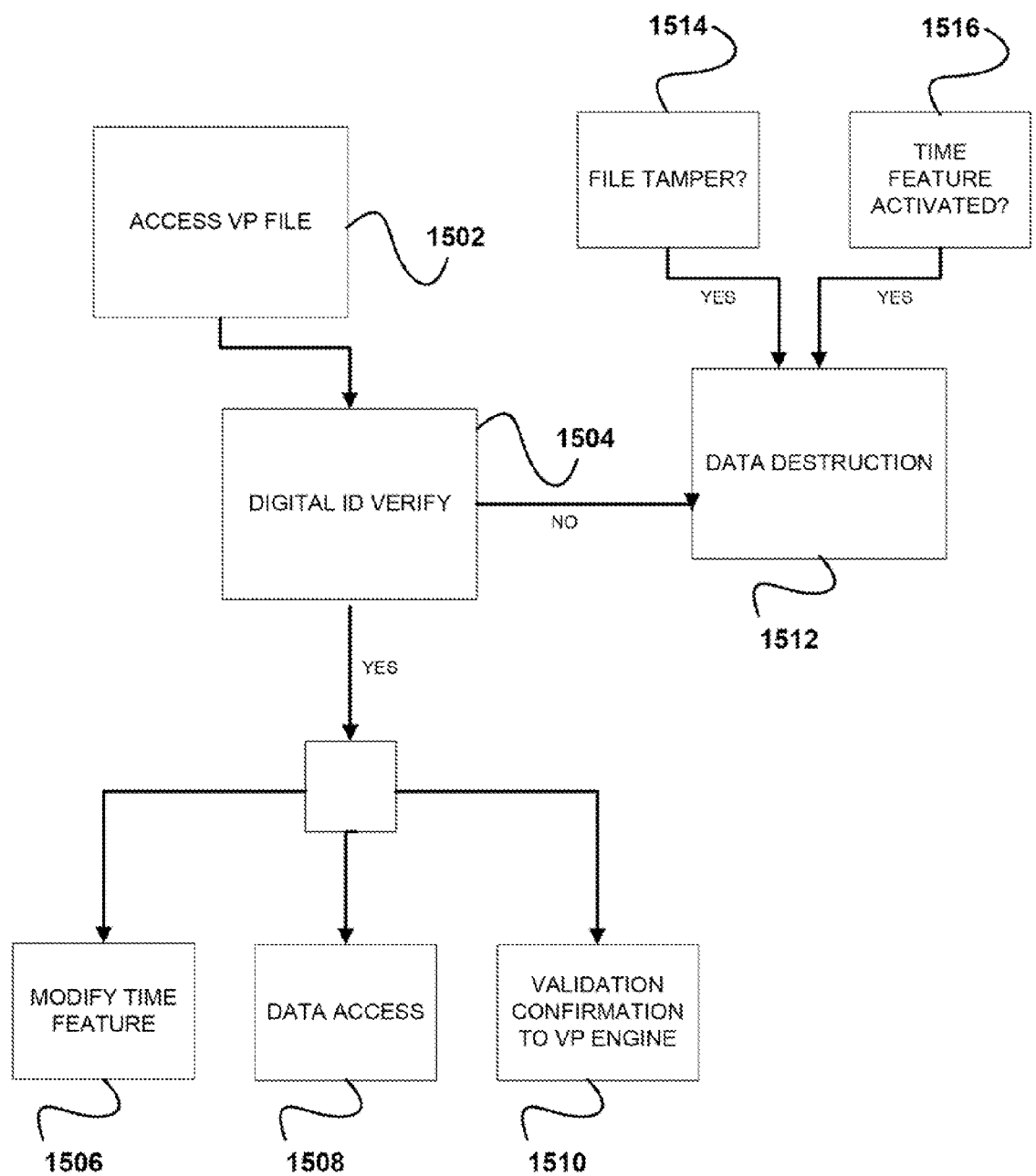
FIG. 15 shows a method of use involving a vault packet file, in accordance with one illustrative embodiment.

In still another preferred general approach, an illustrative embodiment of a method of use involving a vault packet file which includes a time feature is shown in FIG. 15. As shown, in operation 1502 the vault packet is accessed. For example, an access control module or any other mode of file access may be used. In addition, in operation 1504 a digital ID validation is performed in order to determine whether the digital ID of the user matches the ID in the vault packet file. This determination may be performed in any manner. For example, the access control module may compare the ID of the vault packet file against the ID of the entity accessing the vault packet file.

If a match is not found in operation 1504, the data destruction module is triggered in operation 1512. The data destruction module may perform any operation involving the destruction or corruption of vault packet file data, for example, the deletion of data, the addition to or detraction from (e.g., deletion of) portions of the vault packet file data, etc.

If in operation 1514 it is determined that the vault packet file has been tampered with in a forbidden manner, the data destruction module is triggered in operation 1512. Further, in operation 1516 it is determined whether a time feature has been activated. The time feature may be found in one or more of the vault packet file, the vault packet engine, or any other module containing a timestamp. A time feature may activate if a time-related event occurs, for example, if a certain predetermined of time passes after the creation of the vault packet. If the time feature has activated, the data destruction module is triggered in operation 1512. Operations 1514 and 1516 may be performed at any time during the access and verification of the vault packet, file.

If a match is found in operation 1504, then in operation 1506 the time feature is modified. Time feature modification may include any procedure which affects the synchronous time feature of the vault packet file, vault packet server, etc. For example, an access time may be noted, a countdown timer may be stopped, etc.

In addition, in operation 1508 data access is allowed. Data access may include any method of accessing data in the vault file packet. For example, the data may be extracted or ported from the unlocked vault packet. Also, this data may also be accessible to applications other than the ones used to open the file, for example, secondary applications, etc.

In operation 1510 a validation confirmation may be sent to the original sender of the vault; packet file. For example, a positive ID match confirmation may be sent to the vault packet engine, which would then stop any running time feature present in the vault packet engine.

Customer Service Interaction Method

The Customer Service Interaction Method is another reducing currency denomination composite code Generation/Issuance method in the secure payment platform. A benefit of the secure payment platform lies in the inherent secure aspects of the system addressing elements of structural security, without necessitating the need for cumbersome "tethered" applications. In order for a payment process and methodology to be sound, it must be secure, portable, and unencumbered by required peripherals and processes. The customer service interaction provides the ability to generate and issue reducing currency denomination composite codes securely and effectively, while ensuring mobility and on demand generation of new reducing currency denomination composite codes when SCC or Mobile SCC applications are unavailable.

A preferred general method for generating a code associated with a currency value includes receiving a request from a user for a code corresponding to a defined currency value. In addition, authentication data are received from the user. In the context of the present description, authentication data may be any data used for purposes of authentication. For example, authentication data may include a Personal Identification Number (PIN), a password, etc.

Further, it may be determined whether fends pertaining to the user and at least matching the defined currency value are available. Furthermore, a first code is generated or received. Further still, a security code is embedded in the first code for creating a larger composite code, the composite code being associated with the defined currency value. At least the first code is sent to the user.

The authentication data may be transmitted by the user through any medium. For example, the authentication data may be verbally spoken by the user. The authentication data can also be manually input by the user, e.g., by pressing keys on a phone, personal digital assistant, tone-generating system, or any other device the user happens to be using. In addition, the first code may be sent, to the user through any medium. For example, the first code may be audibly output to the user.

Figure 16:
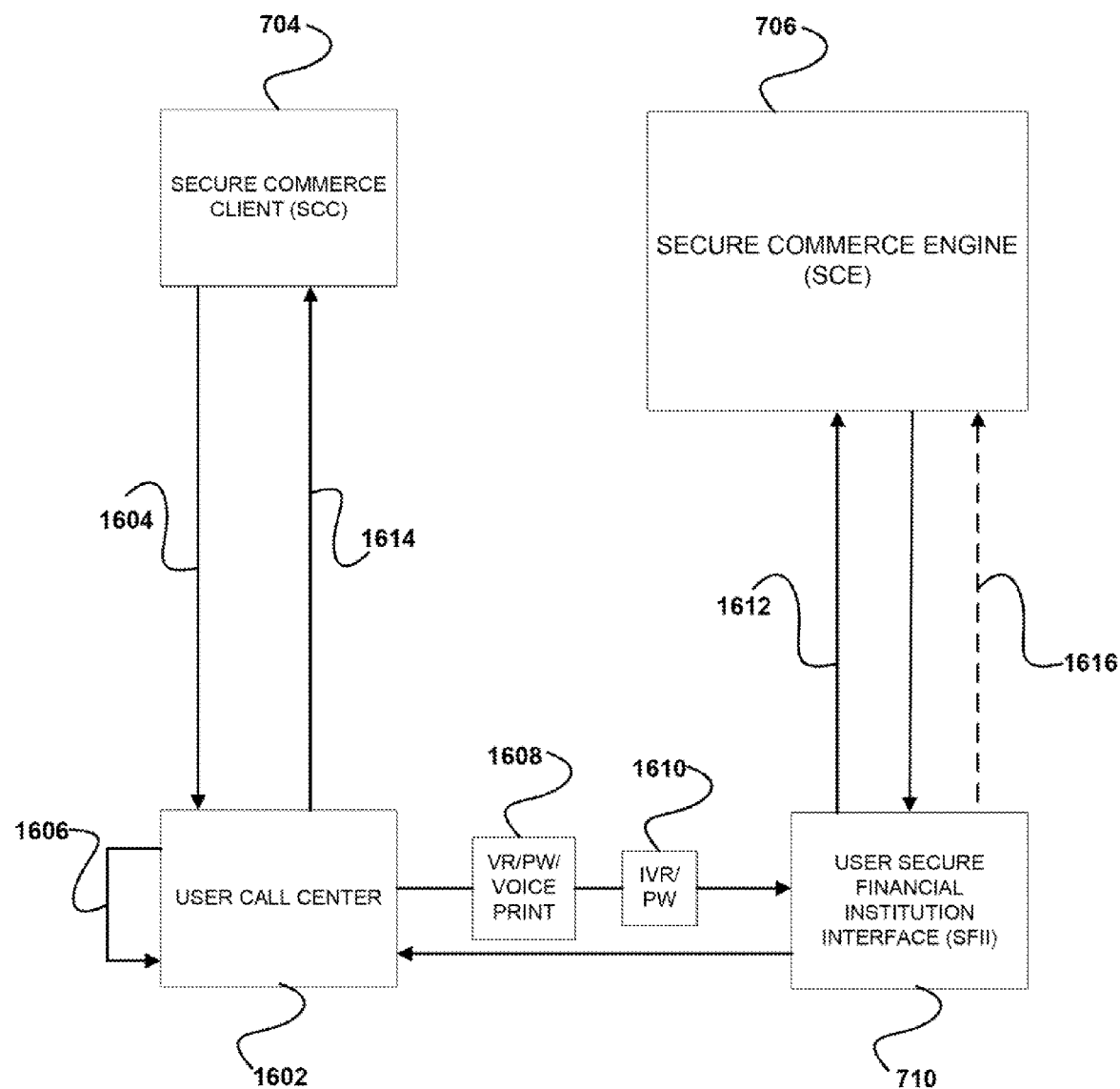
FIG. 16 shows a system for customer service interaction, in accordance with one illustrative embodiment.

Another preferred general approach of the general method, illustrating a system for customer service interaction, is shown in FIG. 16. In operation 1604, a user phones in to the customer service center 1602 of the stated FI, and requests new reducing currency denomination composite code generation. The customer service representative (CSR) asks the user a set of local validation questions per the local protocols of user validation, for example, account number, SSN, mother's maiden name, account types, etc. Following local validation, the CSR will then access the SFII 710 of the FI via the CSR admin GUI, or related FI GUI interface.

Additionally, in operation 1606 the CSR initiates the reducing currency denomination composite code generation request for the stated reducing currency denomination composite code/reducing currency denomination, composite codes and related values. In operation 1608 the CSR passes the user to a voice based security system such as a closed loop IVR, voice print authentication system. During this transfer, for additional security, the CSR may not be able to hear the user.

In operation 1610 the user is prompted to speak the stated password. Upon initial registration with the FI 710, the user will have created a specific user password to initiate a reducing currency denomination composite code generation via this method. The voice recognition system may then validate the user voice print, and related spoken password. Upon validation, as a secondary layer of security, the user may be asked, to enter a previously created numerical password, into the system. However, any method of verification may be used to confirm the user's identity. Upon successful validation, the user is returned to the CSR. The validation/authorization notification is then shown to the CSR in the GUI, and the user is cleared for new reducing currency denomination composite code generation.

In operation 1612 the CSR processes the generation request via the SFII 710. The generation request may be sent, via the SFII 710 to the SCE 706 with the UI in the similar manner to the IP based process. However, due to the absence of the Digital ID, a transaction may be sent to the SCE 706 indicating that it is a manual CSR initiated request.

In operation 1614 the new reducing currency denomination composite code composite structures is generated, and the reducing currency denomination composite code core structures are sent back to the SFII 710. The reducing currency denomination composite code core structures only are then displayed on the CSR GUI. The CSR may then read back the new reducing currency denomination composite codes generated to the user. Following the satisfactory completion of the new verbal reducing currency denomination composite code data transfer to the user, the CSR activates the reducing currency denomination composite codes.

Further, in operation 1616 the reducing currency denomination composite code/reducing currency denomination composite codes activation request may be sent via the SFII 710. The reducing currency denomination composite codes may be activated in the SCE 706, and placed into the active reducing currency denomination composite code DB. The reducing currency denomination composite code/reducing currency denomination composite codes are then ready for use.

R-Reducing Currency Denomination Composite Code: Generation/Transaction Cycle

The R-reducing currency denomination composite code is another aspect of the secure payment platform. The process and application of the R-reducing currency denomination composite code allows for the inherently secure, streamlined, and efficient use of the most rapidly growing and prevalent form of electronic payment transactions globally—the recurring billing transaction. The following section will describe the detailed transaction flow and related component interactions which facilitate and administer the R-reducing currency denomination composite code transactional process.

Figure 17:
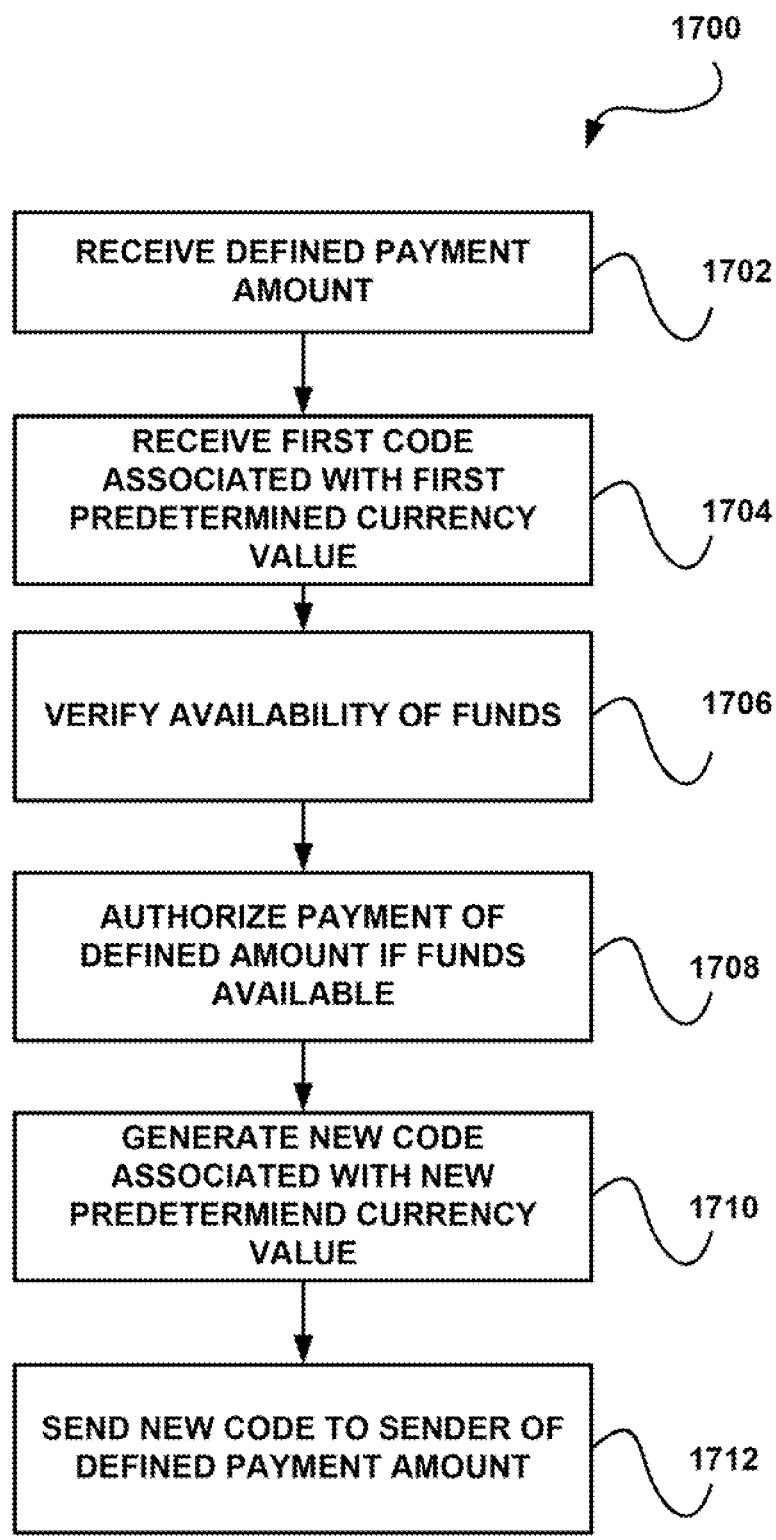
FIG. 17 shows a method for authorizing recurring transactions, in accordance with one illustrative embodiment.

A preferred general method 1700 for authorizing recurring transactions can be described, for example, with reference to FIG. 17. As shown in operation 1702, a defined payment amount associated with a user or entity is received. Further, a code associated with a first currency value is received, where the code is also associated with the user or entity. See operation 1704. This code may be a composite code as described herein, or could be another type of code such as a computer-generated sequence of numerals, characters and/or symbols.

An availability of funds to pay the defined payment amount may be verified in operation 1706. As shown in operation 1708, a payment of the defined payment amount is authorized if funds are available to pay the defined payment amount.

Furthermore, a new code associated with the first or a new currency value is generated. See operation 1710. The new code is sent to a sender of the defined payment amount in operation 1712.

As an option, the defined payment amount may be a same amount from period to period. However, the defined payment amount may be a different amount from period to period. As another option, an alert may be sent if the defined payment amount is above, in or below a predefined value, range, variance or predefined criterion. The values, ranges, variances or predefined criteria may be selected by a user, may be set by the entity issuing or accepting the code, may be based on an average of prior transactions, etc.

As another option, the code may be retired after receipt thereof. Further, the code may be retired upon generation of the new code. As yet another option, the new code may be generated prior to receiving another defined payment amount.

In one optional embodiment, the method may be repeated using new codes for subsequent; defined payment amounts. The codes may be sequential in whole or in part, but are preferably not for enhanced security. Additionally, in one embodiment the code and/or new code may include a merchant identifier portion. To that end, payment may not be authorized if a sender of the defined payment amount is not associated with the merchant identifier portion.

A method for processing recurring transactions according to another preferred general approach of the general method includes sending a request for payment of a defined payment amount to a third party, where the defined payment amount is associated with a user or entity. For instance, the sender may be a merchant, service provider, billing agent, etc, and the user or entity may be a customer thereof. Further, a code associated with a first currency value is sent to the third party, where the code is also associated with the user or entity. Payment equaling the defined payment amount is received. Additionally, a new code associated with a new currency value (which can have the same or different value as the prior code) is received, where the new code is associated with the user or entity.

In another approach, the code may be retired after receipt thereof. Further, the code may be retired upon generation of the new code. In another embodiment the code is not retired.

Further, an alert may be sent if the defined payment amount is above a predefined value, range, variance or predefined criterion. As an option, the above method may be repeated using new codes for subsequent defined payment amounts. Additionally, the code and/or new code may include a merchant identifier portion.

A method for processing recurring transactions according to yet another preferred general method includes sending a defined payment amount and a code to a third party, where the defined payment amount and code are associated with a user or entity. For instance, the sender may be a merchant, service provider, billing agent, etc, and the user or entity may be a customer thereof. A new code associated with a currency value is received, where the new code is associated with the user or entity. Further, a request for payment of the defined payment, amount and the new code are sent. Payment equaling the defined payment amount is received.

As an option, the currency value may be based on a predefined maximum value. Additionally, an alert may be sent if the defined payment amount is above a predefined value, range, variance or predefined criterion.

As an option, the above method may be repeated using new codes for subsequent defined payment amounts. Further, at least the new code may include a merchant identifier portion. In one embodiment, the currency value may be based on the defined payment amount.

Figure 18:
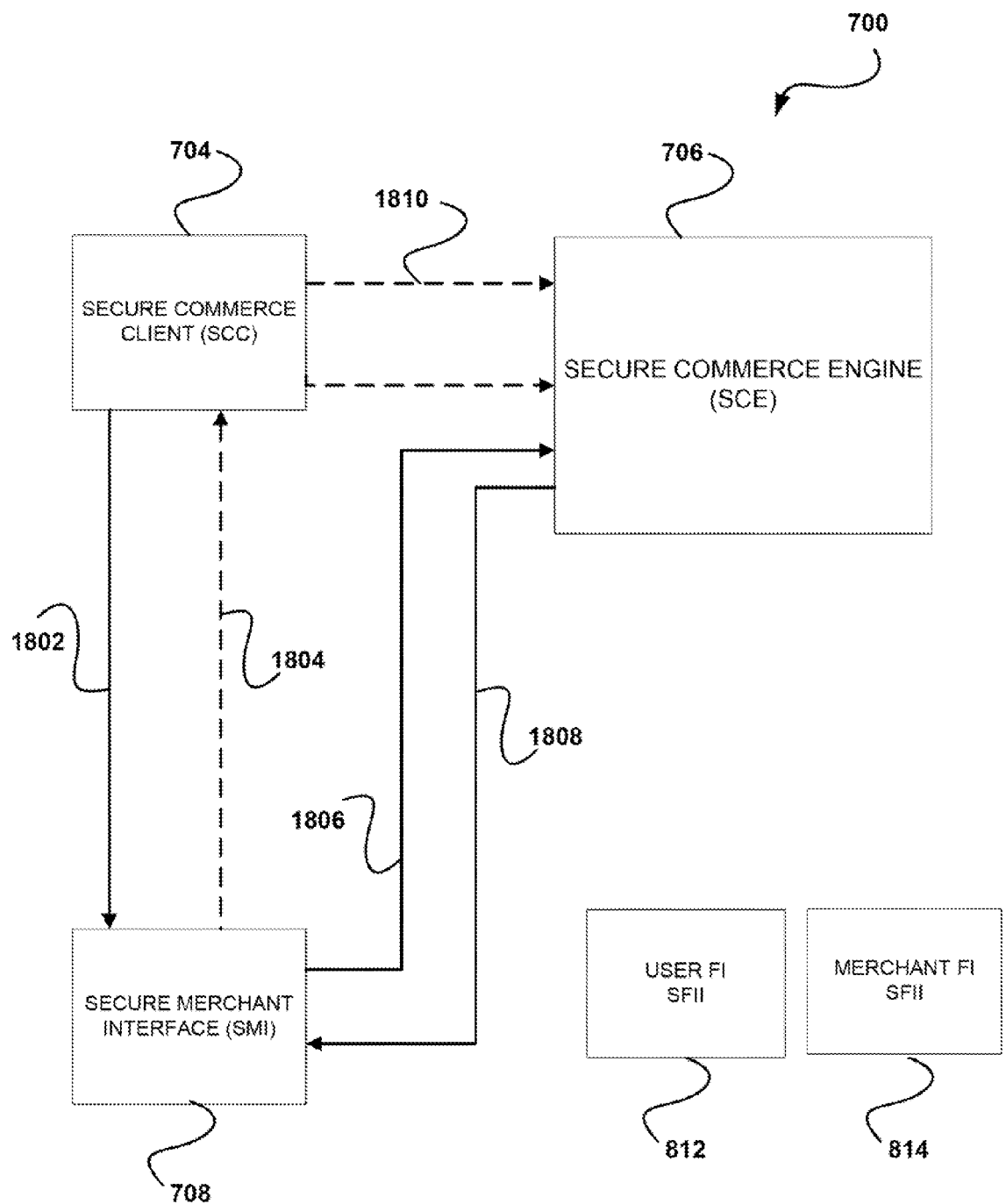
FIG. 18 shows a method for generating an R-reducing currency denomination composite code, in accordance with one illustrative embodiment.

Another preferred general approach of the general method, showing a method for generating an R-reducing currency denomination composite code, can be described, for example, with reference to FIG. 18. As shown in operation 1802, the user signs up to enroll in the R-reducing currency denomination composite code process at the specified merchant via the merchant site and related merchant interfaces 708. Per the enrollment process, and related merchant requirements, the user decides and accepts the terms of the payment process, and subsequent defined payment amount (DPA). For example, in the case of a static payment amount and term, for example, ISP, membership, mortgage, lease payments, etc., the user defines the stated amount to be billed. For non-standard and fluid payment amounts, for example, utilities, phone, cable, etc., the user will agree to the fluid payment structure and resulting DPA.

In operation 1804, per the user validation process, the user provides one current active reducing currency denomination composite code. In addition, the merchant initiates a digital ID request to validate the user via the SMI 708. The digital ID may be validated per the prior process stated in standard reducing currency denomination composite code payment transaction.

Further, in operation 1806, the SMI captures the user data, and sends it to the SCE 706 for processing, and R-reducing currency denomination composite code enrollment with the stated MI. As in a standard reducing currency denomination composite code payment transaction, the SMI 708 may shield the current active reducing currency denomination composite code data for storage capture by the merchant.

In operation 1808 the SCE 706 validates the user and subsequent digital ID. Upon verification, a new R-reducing currency denomination composite code account is created in the SCE 706, and correlated to specific user UI, and MI. A new R-reducing currency denomination composite code may then be generated. The R-reducing currency denomination composite code sequence may begin with an R, and R-reducing currency denomination composite code structural merchant identifier. The new R-reducing currency denomination composite code sequence will then, be sent to the merchant for storage in the local SMI 708.

In operation 1810 the SMI 708 will notify the SCC 704 of the new R-reducing currency denomination composite code enrollment, and stated DPA terms. Upon satisfaction, the user my validate the new R-reducing currency denomination composite code, and send the activation request to the SCE 706. The new R-reducing currency denomination composite code is then ready for usage.

Figure 19:
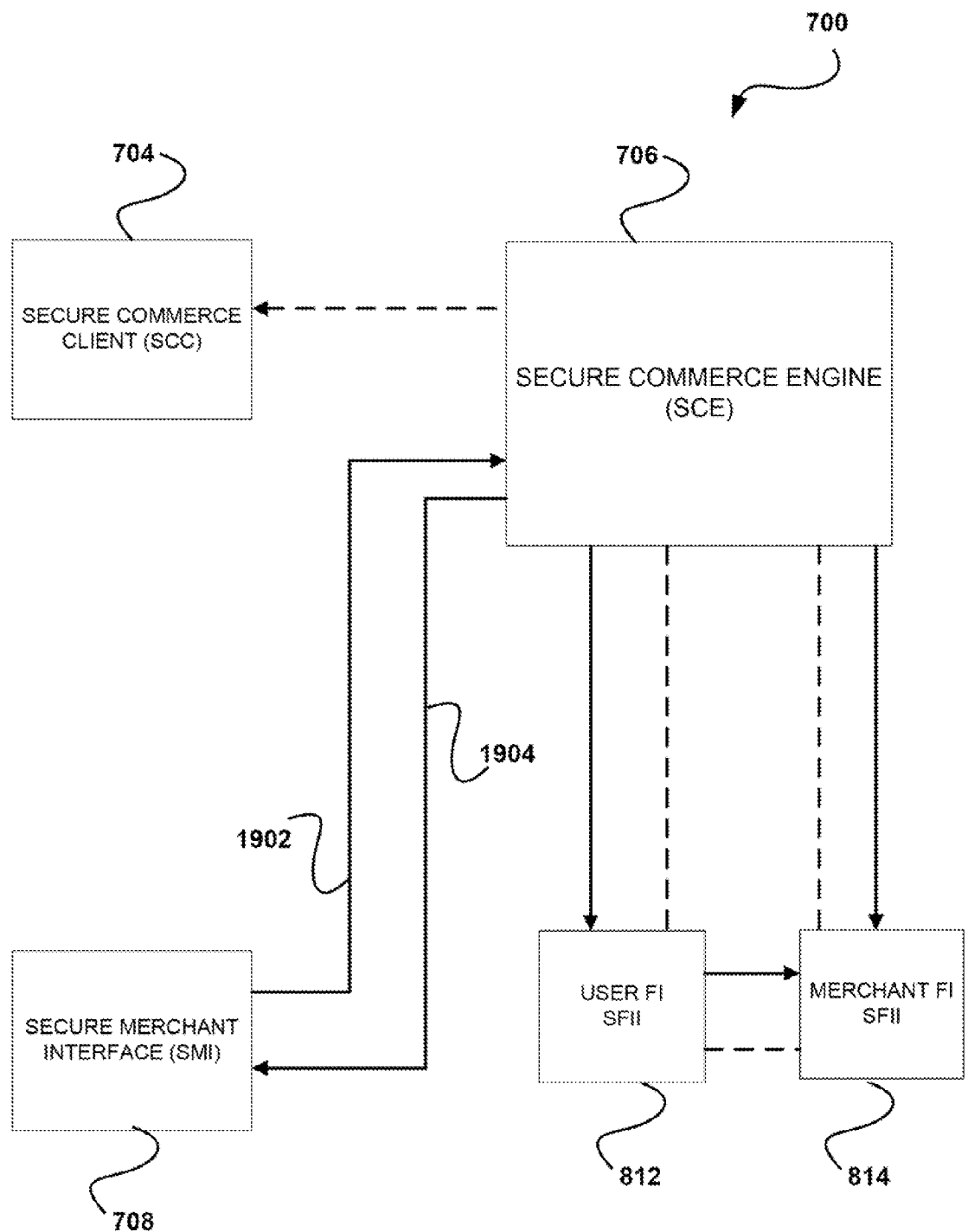
FIG. 19 shows a representative R-reducing currency denomination composite code transactional process, in accordance with one illustrative embodiment.

FIG. 19 further illustrates the R-reducing currency denomination composite code transactional process, in accordance with one illustrative embodiment. As shown in operation 1902, upon the billing cycle, an R-reducing currency denomination composite code transactional cycle request will be sent to the SCE 706. The request will include the current R-reducing currency denomination composite code and DPA. The SCE 706 will then validate the R-reducing currency denomination composite code, and then send it to the stated user SFII 812 for financial authorization. Upon a successful financial authorization, via the SFII 812, the SCE 706 will generate a new R-reducing currency denomination composite code, and R-reducing currency denomination composite code transaction ID file. The SCE 706 will also generate an R-reducing currency denomination composite code settlement request, and send it to the user FI SFII 812 and merchant FI SFII 814 for processing. The final settlement notification will also be sent to the SCE 706 for R-reducing currency denomination composite code settlement closure. A new R-reducing currency denomination composite code transactional notification will also be sent to the user SCC 704 when available.

Additionally, as shown in operation 1904 the new R-reducing currency denomination composite code and transaction ID file will be sent to the merchant or SMI for subsequent use in the next billing cycle.

M-Reducing Currency Denomination Composite Code: Generation/Issuance—Transactions The M-reducing currency denomination composite code system is a flexible and user-configurable payment methodology and application that may be a part of the secure payment, platform. The M-reducing currency denomination composite code in one embodiment addresses a growing and complicated transactional risk, and financial impact payment type-micropayments. Through the use of a user-defined, inherently secure methodology, the M-reducing currency denomination composite code effectively addresses the key issues facing micropayment transactions today. The following section will describe the generation, and subsequent transactional processes of the M-reducing currency denomination composite code.

Figure 20:
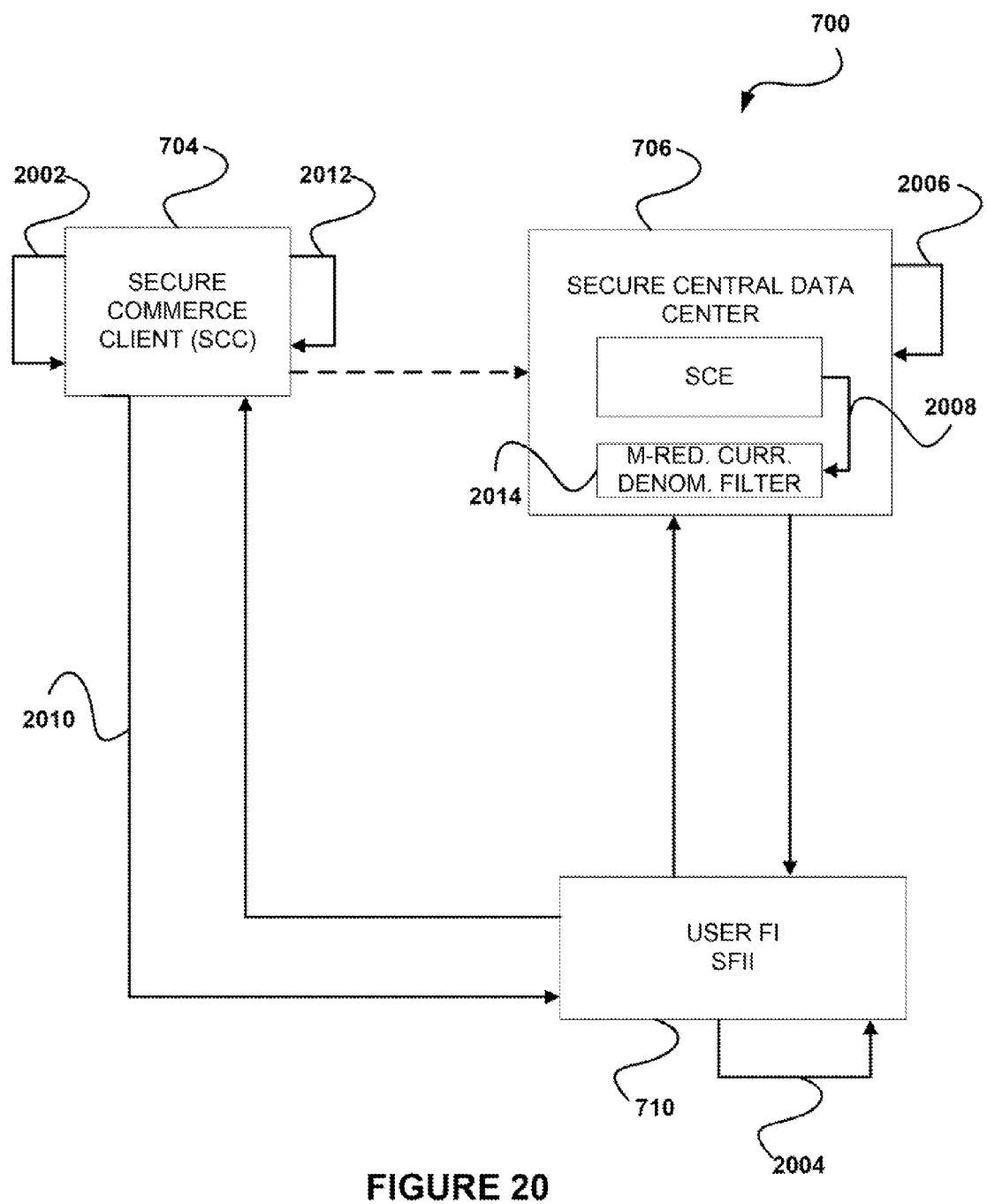
FIG. 20 shows a method for generating an M-reducing currency denomination composite code, in accordance with one illustrative embodiment.

In one preferred general embodiment, as illustrated in FIG. 20, the M-reducing currency denomination composite code generation and transactional process occurs as follows. In operation 2002, the user is allowed to access the reducing currency denomination composite code generation function via the SCC 704. The same local password and access controls in the standard reducing currency denomination composite code generation/issuance function are utilized and required. The user subsequently is allowed to access the M-reducing currency denomination composite code generation function. The user is allowed to select the amount and value of the M-reducing currency denomination composite code/M-reducing currency denomination composite codes requested. In addition, the user is allowed to set the maximum authorization/transactional value of the stated M-reducing currency denomination composite codes. The request, along with the digital ID and serial ID, is sent to the user FI SFII 710 for processing.

In operation 2004, per the standard reducing currency denomination composite code generation process, the SFII 710 validates the stated asset levels or credit limit prior to transfer to the SCE 706, if authorized, the request, and digital ID and serial ID are passed to the SCE 706.

In operation 2006, upon validation of the stated digital ID, and serial ID, the M-reducing currency denomination composite code composite sequence is generated. The sequence may be generated with the same PIN/quintile characteristics as the additional user reducing currency denomination composite code. The primary difference in this embodiment is the "M" character initiating the sequence.

In operation 2008, following the M-reducing currency denomination composite code generation, the M-reducing currency denomination composite code composite and the stated authorization parameters are passed into the M-reducing currency denomination composite code filter application 2014. The M-reducing currency denomination composite code filter application 2014 is an application that preferably resides outside of the active reducing currency denomination composite code DB for initial filtering of all M-reducing currency denomination composite code transactions. Per the user stated authorization parameters, the M-reducing currency denomination composite code passes the filter 2014 to assure the stated authorization criteria is met prior to a transaction proceeding.

Additionally, as shown in operation 2010, the completed reducing currency denomination composite code core sequence is passed to the SFII 710 for transfer to the user via the standard vault packet file/engine process.

Also, as shown in operation 2012, upon receipt, the M-reducing currency denomination composite code may be activated via the SCC 704. The M-reducing currency denomination composite code sequence would then be placed into the active reducing currency denomination composite code DB and be ready for use.

Figure 21:
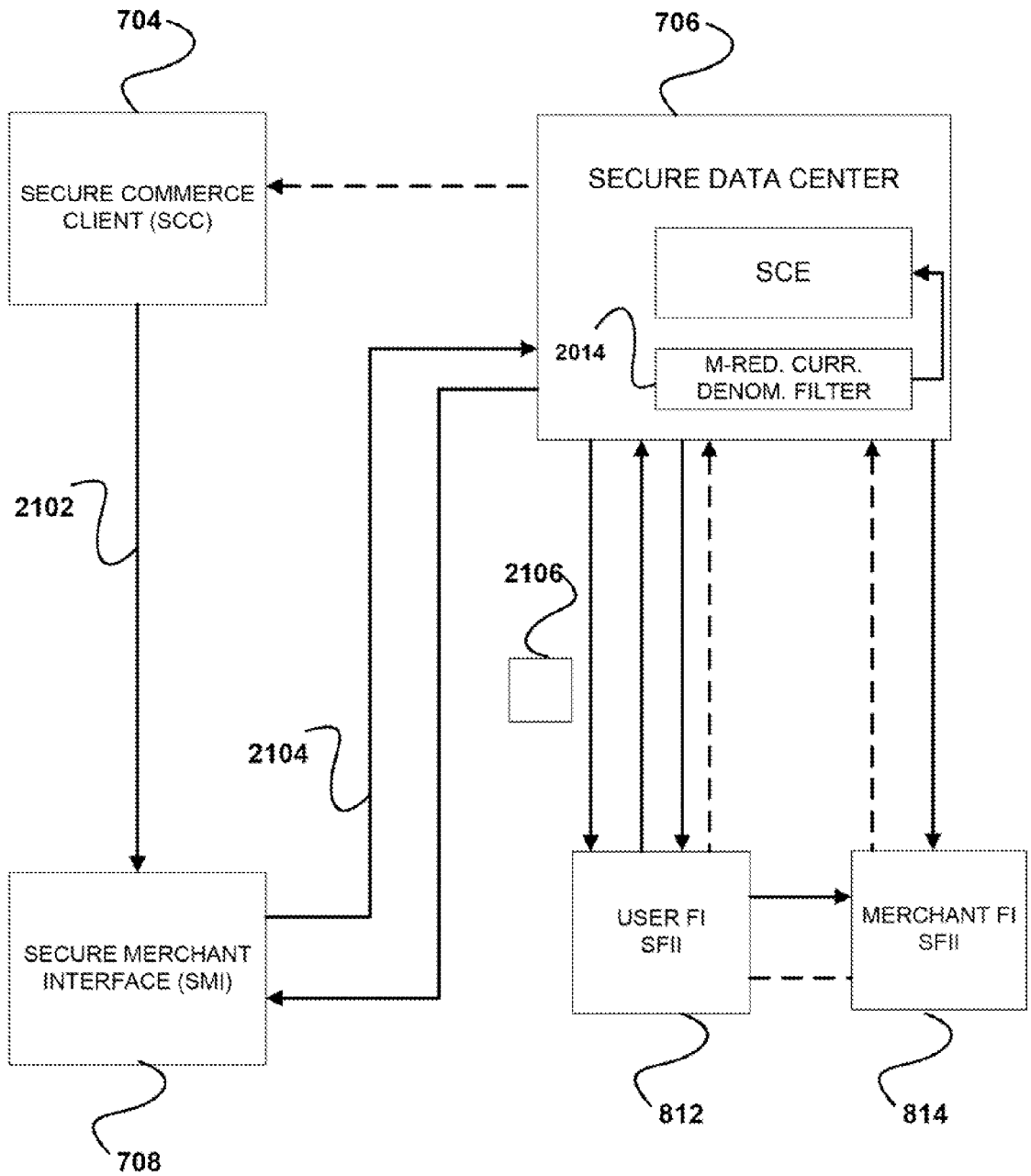
FIG. 21 shows a representative M-reducing currency denomination composite code transactional process, in accordance with one illustrative embodiment.

Further information regarding the M-reducing currency denomination composite code transactional process is shown in another exemplary embodiment in FIG. 21. As shown in operation 2102, when ready to checkout, the user is allowed to enter the M-reducing currency denomination composite code in the same manner as the standard reducing currency denomination composite code. The M-reducing currency denomination composite code optimization function can also be applied. The M-reducing currency denomination composite code optimization feature is the same as the standard reducing currency denomination composite code optimization feature, however is utilized for M-reducing currency denomination composite code based transactions.

In operation 2104 the M-reducing currency denomination composite code and related transactional data is passed to the SCE 706 via the SMI 708 in the same manner as a standard reducing currency denomination composite code. However, upon receipt in the SCE 706, the M-reducing currency denomination composite code is flagged and initially passed through the M-reducing currency denomination composite code filter 2014 prior to authentication.

If authenticated, the M-reducing currency denomination composite code is processed via the same process as a standard reducing currency denomination composite code. The same processes for settlement of the reducing currency denomination composite code are applied as well. See operation 2106.

SPP: Components—Structural/Arct. Overview

The following section will analyze the components in a preferred embodiment of the secure payment platform in further detail, reviewing the underlying structure, applications, and composition of each component and application. However, it should be noted that embodiments of the secure payment platform need not include all of the components illustrated below, or may include other components.

Secure Commerce Client (SCC)/Mobile SCC

Standard Secure Commerce Client (SCC)

The secure commerce client may comprise one or more of the following components, and/or others: the main user GUI, the local ODBC compliant DB, the secure IP port interface, the request handler, the digital ID management application, and the central control application.

Figure 22:
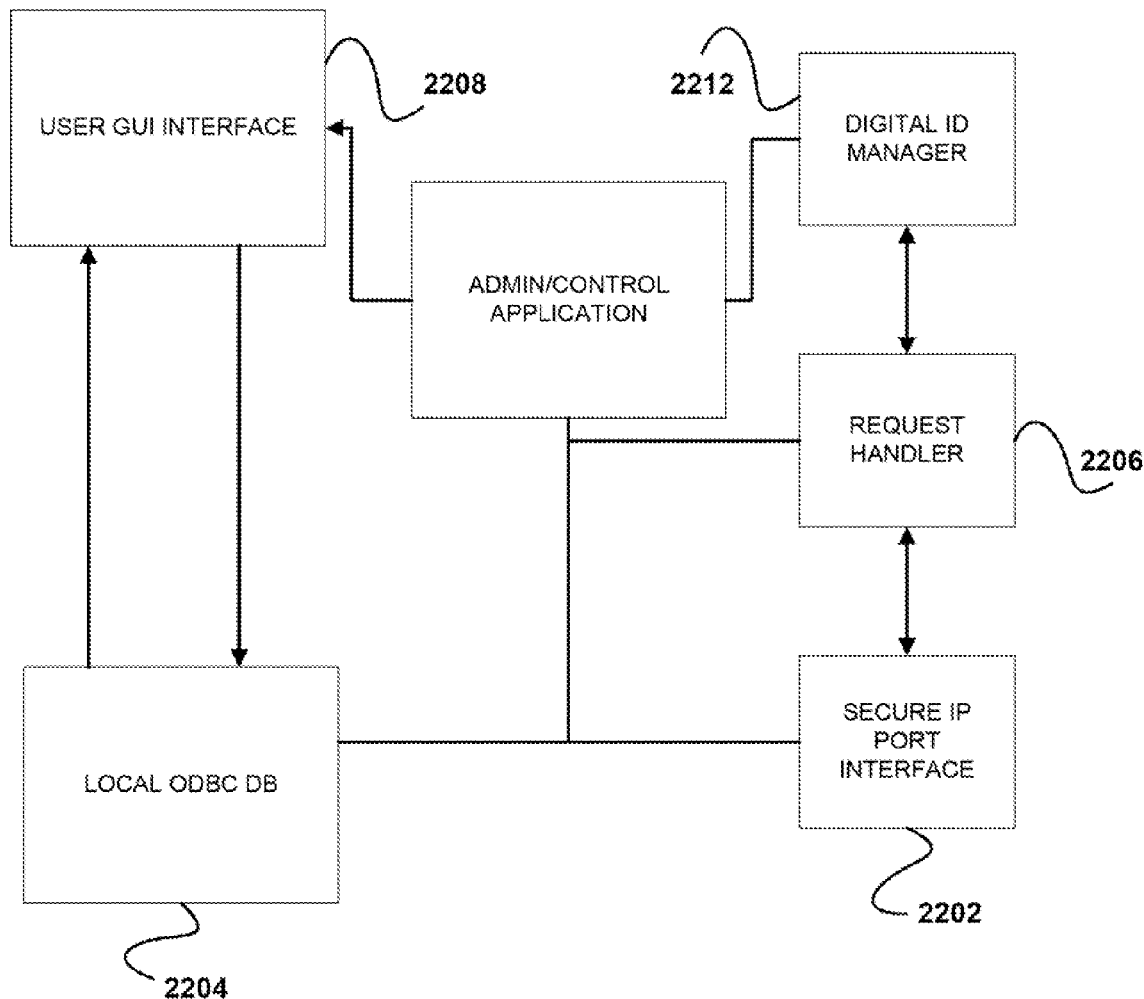
FIG. 22 illustrates a secure commerce client architecture, in accordance with one illustrative embodiment.

One illustrative embodiment of the architecture of the SCC is illustrated in FIG. 22. As shown, the secure IP port interface 2202 maintains secure encrypted communication with the SCE, SMI, and SFII. Any communication port based on the local system configuration may be utilized. Further, local ODBC DB 2204 stores all critical reducing currency denomination composite code, R-reducing currency denomination composite code, M-reducing currency denomination composite code, and historical transactional data.

In addition, the request handler 2206 handles and facilitates all inbound requests to the SCC. The user GUI interface 2208 is the user GUI interface application for the SCC and displays all relevant user data and commands to execute an effective transaction. The GUI may be based on a Web-Like interface and may be potentially based on Java or any other interface. The GUI may display active icons, with dynamic switching between displays and areas. Menu structures will be displayed on the left, with the supporting windows on the right side. Navigation tabs will also lie atop the display windows.

Further, the admin/control application 2210 functions as a control application of the SCC. It routes and executes all GUI requests to the proper areas. Address, and controls all supporting applications of the SCC. It additionally allows for and supports synchronization with the mobile SCC, and supporting peripheral applications. Additionally, all local password authentication and security applications may be housed and executed in the control application.

Additionally, the digital ID Manager 2212 stores, executes, and supports the secure use, management, and delivery of the user/SCC digital ID.

Mobile SCC

The mobile SCC maintains a similar structure as the SCC. However, the Mobile SCC maintains a significantly smaller footprint. The mobile SCC may be supported and developed on many platforms, such as Windows Mobile, Symbian 9.3, RIM, and related applicable Linux based platforms.

The mobile SCC additionally may maintain the same subset of applications. The user GUI, may be streamlined, as may the local mobile ODBC compliant DB. However, many aspects of the digital ID Management application are present. In addition, many of the same local passwords and related, security layers will be present. In addition, the secure IP port interface may be present, yet may be transacting over the stated secure IP protocols, and the structure of the supporting cellular/mobile data network (CDMA, GPRS, EDGE/3G, TDMA, etc.).

Secure Commerce Engine (SCE)

The secure commerce engine in one preferred embodiment is comprised often main components: the secure IP pipeline manager, the request handler, the reducing currency denomination composite code generation engine, the active reducing currency denomination composite code DB, the UI/MI manager, the M-reducing currency denomination composite code filter, the validation engine, the reducing currency denomination composite code screen, the reducing currency denomination composite code historical archive, and the central SCE administration system. In addition, the SCE may be protected at its perimeter by a strong and highly secure network parameter security system, highly secure intrusion detection and system defense systems, and strong physical security controls. In addition, the internal configuration of the SCE may be parsed, and shielded in data silos to ensure a further level of security and data location masking.

Figure 23:
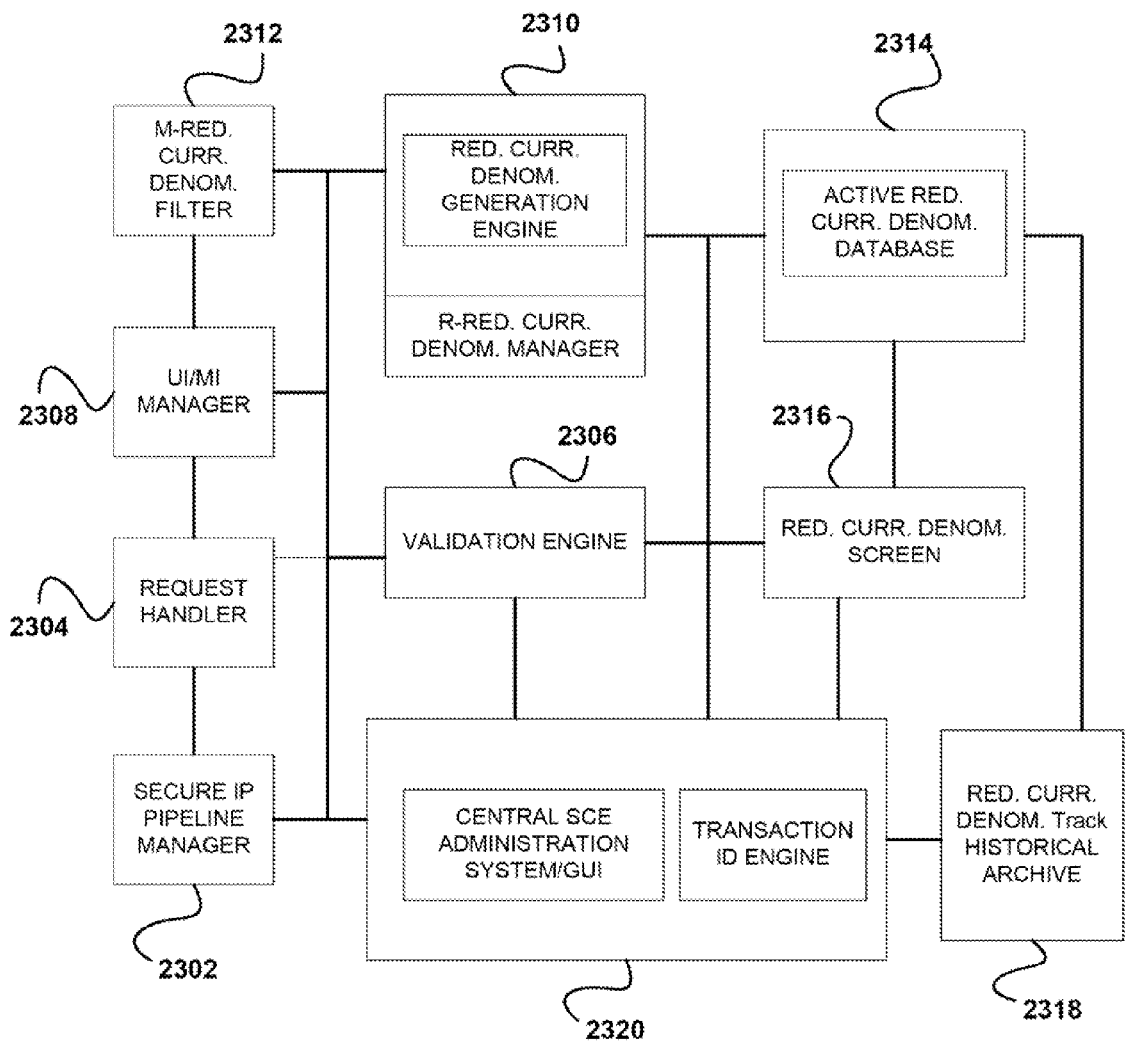
FIG. 23 illustrates a secure commerce engine architecture, in accordance with one illustrative embodiment.

In one embodiment, as shown in FIG. 23, the architecture of the SCE is as follows. The secure IP pipeline manager 2302 handles and manages all Secure IP and related secure connections to the supporting SCC, SMI, and SFII installations. The request handler 2304 manages and effectively routs all inbound requests and transactions in the SCE.

The validation engine 2306 manages and executes the validation of all user digital ID signatures and related security protocols. Additionally, the validation engine 2306 manages the newly generated reducing currency denomination composite code activation process and related transactions from the SCC.

The UI/MI manager 2308 manages all UI and MI settlings and attributes. The UI manager 2308 effectively manages all attributes and settlings of the corresponding UI and MI in the SCE. It is utilized in many transactions. In addition, any updates to the settlings are enacted and administered in the UI/manager 2308, via the central SCE admin system 2320.

The reducing currency denomination composite code generation engine 2310 generates all new reducing currency denomination composite code, M-reducing currency denomination composite code, and R-reducing currency denomination composite code in the SPP. The reducing currency denomination composite code generation engine additionally maintains a sub-application to handle all R-reducing currency denomination composite code requests, and generate new replacement R-reducing currency denomination composite code with the stated attributes. In addition, all new M-reducing currency denomination composite code requests are passed though the M-reducing currency denomination composite code filter prior to reaching the engine, and an "M" character generating request effetely applied. Following activation, all newly generated reducing currency denomination composite code, and M-reducing currency denomination composite codes are passed into the active reducing currency denomination composite code DB for use.

The M-reducing currency denomination composite code filter 2312 manages all settings, related attributes, and initial transactional processes for all M-reducing currency denomination composite codes. All new M-reducing currency denomination composite code requests and related authorization limits are recorded in the M-reducing currency denomination composite code filter 2312 for further processing. In addition, all inbound authorization requests are routed via the request handler, first through the filter 2312, prior to authorization in the active reducing currency denomination composite code DB.

The active reducing currency denomination composite code DB 2314 may manage all currently active reducing currency denomination composite codes and M-reducing currency denomination composite codes in the SPP. The active reducing currency denomination composite code DB acts as the main point of authorization and subsequent settlement of all current active reducing currency denomination composite codes and M-reducing currency denomination composite codes in the system. All reducing currency denomination composite code composite sequences and corresponding current values are stored in the DB 2314. All aspects of the various transactions and usage of the reducing currency denomination composite code/M-reducing currency denomination composite codes may be stored in the active reducing currency denomination composite code DB 2314 as well. When completed or retired, all reducing currency denomination composite code/M-reducing currency denomination composite codes may be invalidated and/or passed into the reducing currency denomination composite code historical archive 2318 for storage and transactional analysis, along with all aspects of their corresponding transactions. All R-reducing currency denomination composite codes and related replacement cycle transactions may be maintained in the generation engine 2310.

Additionally, the reducing currency denomination composite code screen 2316 is a secure transactional screening filter for incoming authorizations. All authorizations and related transactions may be passed through the reducing currency denomination composite code screen 2316 for analysis. Utilizing a neural-network and rules based system, the reducing currency denomination composite code screen 2316 analyzes key attributes of the transaction. Combined with the historical transactional data in the active DB 2314, the reducing currency denomination composite code screen 2316 flags potential unauthorized usage or related transactional anomalies. Any tagged transactions are preferably stopped prior to authorization and declined prior to proceeding further.

Further, the reducing currency denomination composite code historical archive 2318 stores, archives, and maintains all completed, retired, and invalidated reducing currency denomination composite code/M-reducing currency denomination composite code/R-reducing currency denomination composite code in a historical DB. All attributes of the transactions utilized with the respective reducing currency denomination composite codes are stored as well, in addition to the corresponding transaction ID files. The HCD historical archive 2318 acts as a central repository for all transactional data in the SPP, and is utilized by both the reducing currency denomination composite code screen 2316 and the central SCE administration system 2320 to analyze and access historical data in the SPP.

The central SCE administration system/GUI 2320 acts as an administrative and control utility in the SCE. The central SCE administration system 2320 oversees and controls all data flow and functions within the SCE and acts as the control point. The application also controls a central admin GUI Interface, for use by the central system administration team. All functions in the SCE are monitored and controlled via this process. In addition, the central SCE administration system 2320 is the application which creates, structures, controls, and stores all transaction ID files and the underlying structured reducing currency denomination composite code and transactional data via the centralized transaction ID engine.

Secure Merchant Interface (SMI)

The secure merchant interface may contain one or more of the following components: a secure IP port interface, system integration channels, a central SMI administration system/GUI, a reducing currency denomination composite code data shield, merchant transactional manager, and a R-reducing currency denomination composite code merchant manager.

Figure 24:
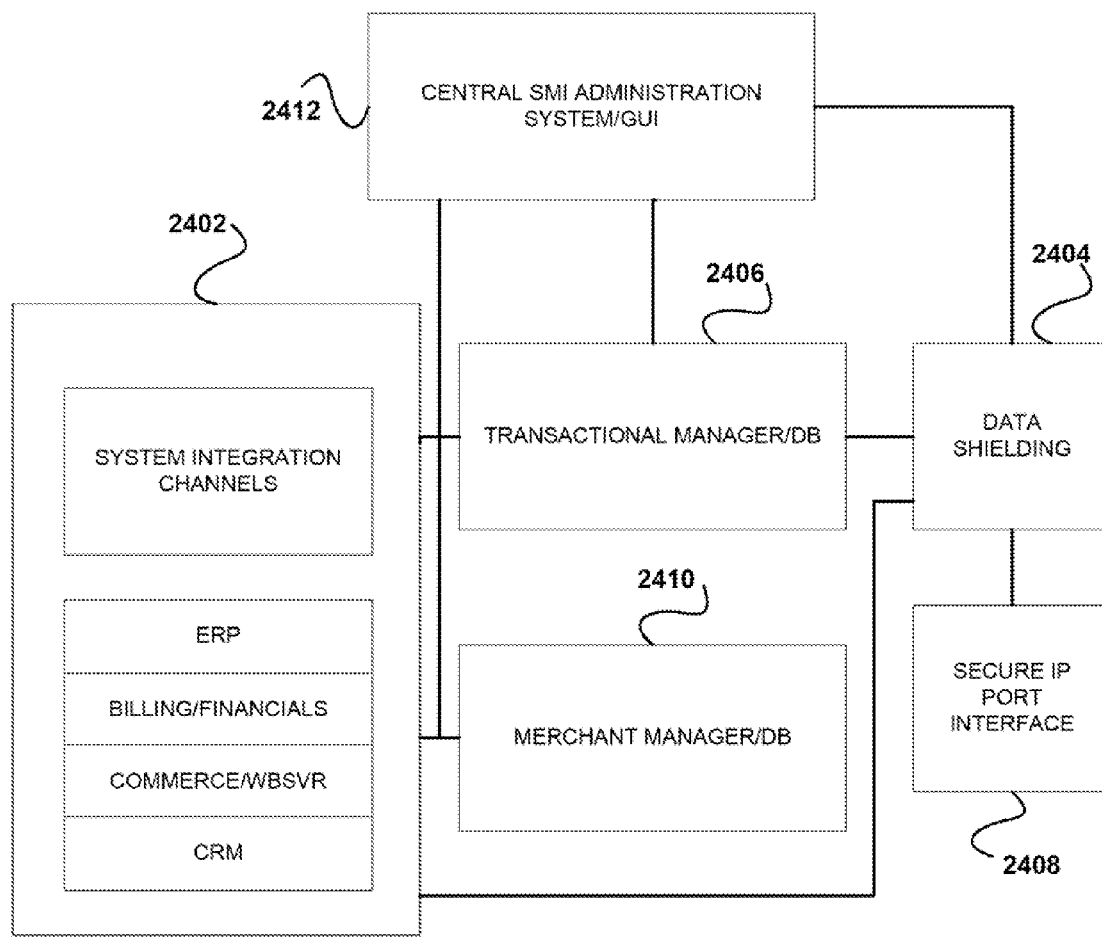
FIG. 24 illustrates a secure merchant interface architecture, in accordance with one illustrative embodiment.

In one preferred general embodiment, as illustrated in FIG. 24, the architecture of the SMI is as follows. The system integration channels 2402 maintain and enable integration of the SMI into key merchant back end and front end applications. The system integration channels 2402 applications allow for the capture and collection of key required reducing currency denomination composite code transactional data from the e-commerce/commerce/billing applications, and subsequent filtering into the reducing currency denomination composite code data shielding application 2404. Per the integration processes, no capture of the pre authorization reducing currency denomination composite code data from the related commerce applications into the merchant DB/Systems is allowed.

The reducing currency denomination composite code data shield 2404 allows for the facilitation and shielding of key reducing currency denomination composite code transactional data prior to authorization. Per the stated integration process, the integration channel application 2402 will initiate a transactional request and pass the application through the reducing currency denomination composite code data shield 2404. Prior to a transaction request being processed, the filter will mask the data from the merchant, not permitting the capture of the information. As an additional security process, the integration channel 2402 will only permit the reducing currency denomination composite code composite fields to be passed through the reducing currency denomination composite code data shield 2404, and not into any additional data capture source or DB.

Furthermore, the transactional manager 2406 acts as a transactional management utility for the merchant. All transaction requests (authorization, settlement etc.) for all reducing currency denomination composite code/M-reducing currency denomination composite code based transactions will be initiated and tracked through this application. In addition, the transaction manger 2406 will capture and track all created transaction ID files and supporting data for transactional settlement and reconciliation. All transaction ID file data may be captured and stored by the merchant for integration, storage, and management within their back-end ERP/CRM/billing systems. All digital ID validation requests are initiated via the transactional manager 2406 as well.

The Secure IP port interface 2408 manages all secure IP-based communication and additional secure data communication channels with the SCC, SCE, and SFII.

Additionally, the R-reducing currency denomination composite code merchant manager 2410 manages all aspects of the merchant R-reducing currency denomination composite code and R-reducing currency denomination composite code transactional processes. The R-reducing currency denomination composite code manager 2410 stores all current user/merchant R-reducing currency denomination composite codes and the corresponding DPA types. In conjunction with the system integration channel and related billing system integration the R-reducing currency denomination composite code manager 2410 initiates the new R-reducing currency denomination composite code billing cycle requests and subsequent transactional and data updates.

The central SMI administration system/GUI 2412 manages all data, transaction flow, and functions of the SMI. The central SMI administration system also integrates a GUI interface for use by the internal merchant system administrators and related operators and developers. The GUI and application provide hooks for integration into additional areas of the back end ERP system and monitoring applications for further centralization of the system monitoring activities.

Secure Financial Institution Interface (SFII)

The secure financial institution interface may include the following components: a secure IP-port interface, a UI/MI correlation engine, a request handler, an FI active reducing currency denomination composite code DB, transactional management, system integration channels, and a central SFII administration system/GUI.

Figure 25:
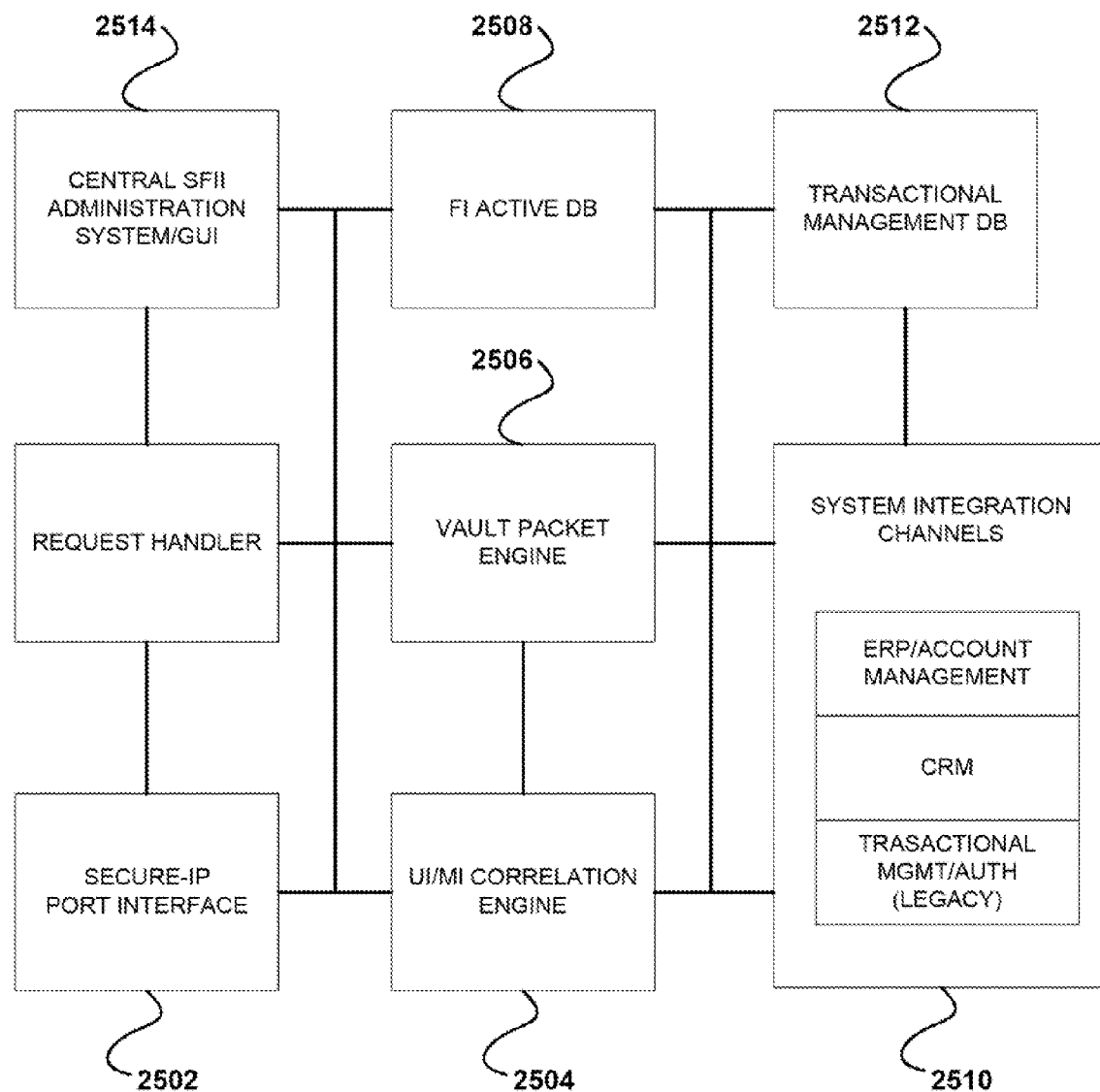
FIG. 25 illustrates a secure financial, institution interface architecture, in accordance with one illustrative embodiment.

In one embodiment, as shown in FIG. 25, the architecture of the SFII is as follows. The secure IP-port interface 2502 manages all secure IP based communication and additional secure data transactions between the SCE, SMI, and SCE. Additionally, the secure IP-Port interface 2502 manages the secure download and delivery of all vault packet related data.

Further, the UI/MI correlation engine 2504 manages all UI and MI correlation processes between the stated UI/MI, and related financial institution related accounts. The UI/MI correlation engine 2504 stores all the correlated account data and acts as the primary filter for all reducing currency denomination composite code/M-reducing currency denomination composite code generation and all merchant initiated reducing currency denomination composite code transaction/settlement requests, lire UI/MI correlation engine 2504 is a secure component of the SFII, and protected with the strongest available local network security protocols.

Additionally, the vault packet engine 2506 manages the creation, secure user digital ID encoding, delivery, and validation of all vault packet files within the SFII. The vault packet engine 2506 additionally performs the initial user digital ID and serial ID authentication processes for a stated user prior to delivery to the SCE. The vault packet engine stores the related authentication data (digital ID and serial ID) correlated to the UI of the stated user with the engine for validation.

The FI active reducing currency denomination composite code DB 2508 stores and maintains all active and currently active reducing currency denomination composite code, M-reducing currency denomination composite code, and R-reducing currency denomination composite codes for a stated user/UI. The active reducing currency denomination composite code DB 2508 stores the reducing currency denomination composite code composite sequences and related value data within the SFII for storage and correlation to the SCE stored data. The FI active reducing currency denomination composite code DB 2508 is not accessed during the authorization process (reducing currency denomination composite code initial authorization occurs in the SCE), yet it acts as a backup and monitoring data source for the FI and for the integration and access of the data from the back end ERP/CRM/account management systems 2510.

Also, the transactional management DB 2512 stores and records all transactional data for a specified user/UI, merchant/MI, and related reducing currency denomination composite code/M-reducing currency denomination composite code/R-reducing currency denomination composite code data. The transactional management DB 2512 stores all of the detailed transactional data (reducing currency denomination composite codes utilized, transaction ID file, etc.) for access and initial storage for subsequent integration and delivery to the back end account management and billing systems. Additionally, the transactional management DB 2512 manages the transactional settlement process and subsequent inter-FI fund delivery processes.

Additionally, the central SFII administration system 2514 controls and manages all transactional and data flow functions within the SFII. Additionally, the central SFII Administration system 2514 provides a detailed GUI interface for use and monitoring via the network/system administration teams and related personnel. In addition, a CSR specific GUI is included for access and use within the CS interaction reducing currency denomination composite code generation process. All IVR, and voice recognition authorization systems, and related functionality are stored in the central SFII admin system 2514 as well. Preferably, all interfaces are able to be integrated into the existing ERP/CSR and related customer service and network administration systems for additional consolidation with existing interfaces.

SPP: Point-of Sale (POS)—System Overview

The secure payment platform point-of-sale (POS) system, or SPP-P, is an integrated sub-system of the secure payment platform utilizing many of the current components of the SPP. The primary focus of the POS/SPP system is to facilitate the key transactions in a direct point-of-sale environment, while integrating the key unique functional and operational processes and procedures inherent in such a transaction. The SPP-P system utilizes the four current main system components, while adding many additional applications: the secure merchant interface-P, terminal-SMI, and the Smart card.

SPP-POS System: Components

Secure Merchant Interface-P (SMI-P)

The secure merchant interface-P, or SMI-P, is a primary merchant point-of-sale interface to the secure payment platform. The SMI-P may reside on the merchant POS system or register application and allows for secure IP based communication and related transactional processing with the SCE and SFII.

The SMI may execute one or more of the following key functions, and/or others;

Reducing currency denomination composite code transactional processing (authorization/settlement)

Secure local transactional management

Figure 27:
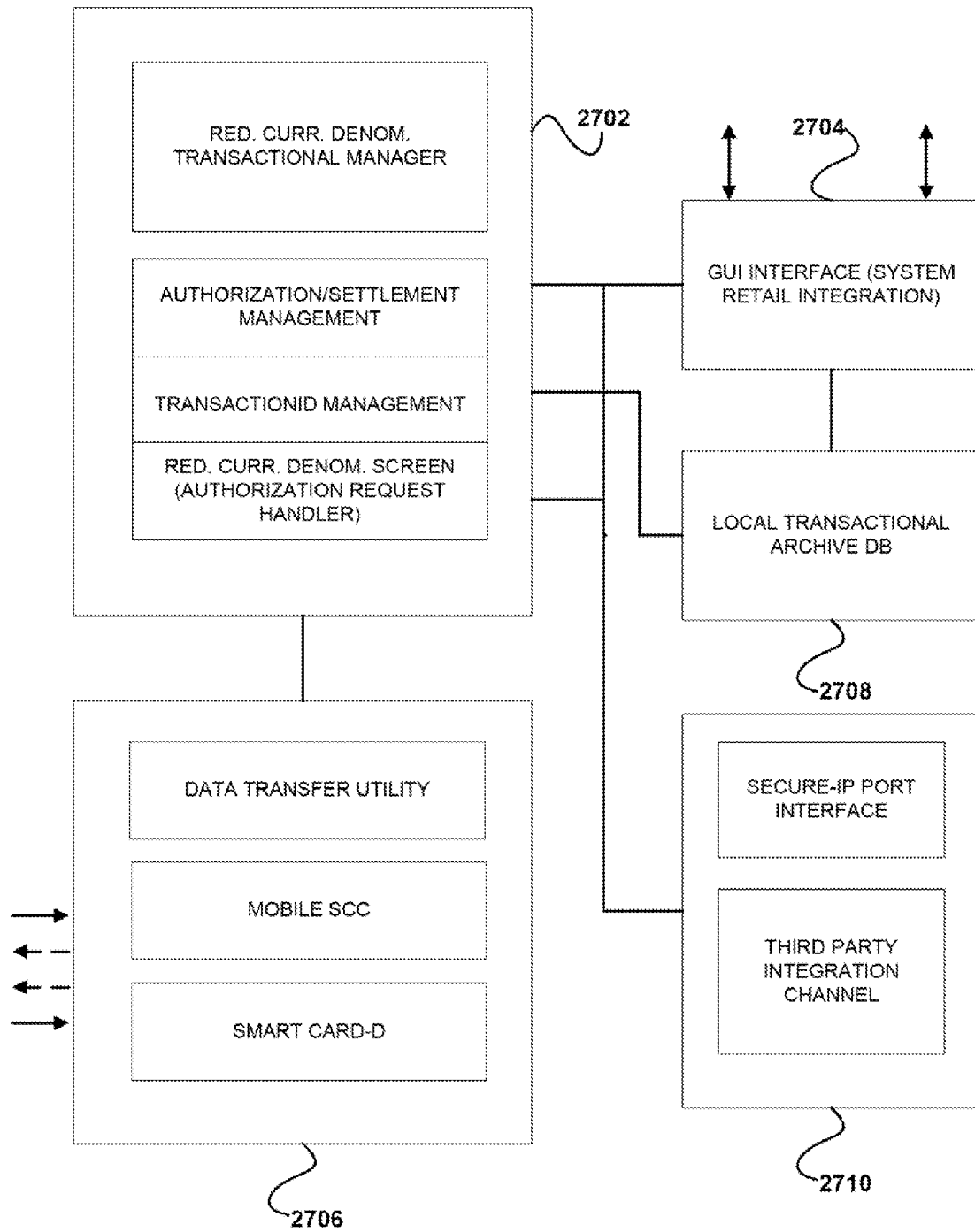
FIG. 27 illustrates a secure payment platform interface architecture, in accordance with one illustrative embodiment.

Transactional ID storage
Local reducing currency denomination composite code data shielding.
Peripheral interface
   Mobile SCC
   Smart card
   Third party HW integration In one embodiment, the SMI-P includes the following components and related architecture as shown in FIG. 27. In use, the reducing currency denomination composite code transactional manager 2702 acts as a transactional management utility in the SMI-P. The reducing currency denomination composite code transactional manager 2702 manages the initial reducing currency denomination composite code authorization requests and correlated transaction ID File information, in addition to the subsequent reducing currency denomination composite code settlement request. The reducing currency denomination composite code shield function is additionally housed in the reducing currency denomination composite code transactional manager 2702, and allows for the non-capture of full reducing currency denomination composite code composite data during the transactional process.

Further, the GUI interface 2704 is a GUI interface for the POS terminal and related system. The SMS-P comes with a default GUI screen, with the main required functionality available to the user/personnel. The main functions of sale amount, reducing currency denomination composite code transaction, and the related cashiering functions are all present. In addition, monitoring of daily transactions, subsequent settlement processing, and general merchant administration features are preferably all available via this interface. The GUI interface 2704 additionally can be integrated into a current POS system/touch screen interface via simple "hooks" inherent in the application and related command processes.

The data transfer utility 2706 is a reducing currency denomination composite code data capture interface for the SMI-P. The utility 2706 allows for the capture of the user/client reducing currency denomination composite code data from the payment mechanisms, for example, mobile SCC, smart card interface, etc. The reducing currency denomination composite code data from the mobile SCC will be captured via a direct IR transfer or local Bluetooth/P-LAN Transfer method and processed, and the key reducing currency denomination composite code composite data will be passed to the reducing currency denomination composite code transactional manger for processing. The smart card reducing currency denomination composite code core data will be captured from the smart card reader/interface, combined with the PIN quintile entered via the reader/interface, and the final reducing currency denomination composite code composite sent to the reducing currency denomination composite code transactional manager 2702 for subsequent processing.

Also, the transactional archive/DB 2708 is a reducing currency denomination composite code/merchant transactional data storage utility for the SMI-P. The transactional archive/DB 2708 stores all merchant transactional information, related transaction ID File, and merchant specific transaction information for local monitoring and analysis of merchant; initiated transactions from the specific POS terminal/system. The DB can additionally be synchronized with a central transactional archive DB in a multi-terminal environment, and can also be synchronized with a core central enterprise DB (and/or SMI) in a multi-location/merchant environment. The transactional archive/DB 2708 data can additionally be synchronized with the main SMI/Transactional Manager/DB for a specified merchant in a multi-channel transactional environment.

Additionally, the secure-IP Port Interface 2710 manages all secure IP-Based communication between the SMI-P and the SCE and SFII. The secure IP-Port interface 2710 sends secure data between the local POS terminal and SPP components via a local network interface, e.g. a TCP/IP network. In addition, the third party POS system integration capabilities may be housed in the secure-IP port interface utility. Integration of the SMI-P into the main current enterprise/local POS systems (for example. Squirrel, Volant, AccuPOS, etc.) will be possible, with built-in integration functionality. The integration of the GUI interface 2704, with the required systems commands and executables will be synchronized and configured to ensure rapid and fluid transaction processes.

Mobile Secure Commerce Client (Mobile SCC)

The Mobile SCC is one example of a user interfaces to the SPP-P System. The user will store and maintain the reducing currency denomination composite code/M-reducing currency denomination composite codes and related balances locally in the mobile SCC. When ready/upon checkout, the user will access the POS function in the mobile SCC. The user may then access the reducing currency denomination composite code optimization feature under the POS command to optimize current reducing currency denomination composite code usage.

To expedite the transaction, the user may choose to bypass the function and simply select the reducing currency denomination composite code, enter the PIN code section, and select transmit. The reducing currency denomination composite code data will then be encrypted and sent via a local IR transfer to the POS system. In addition, a local secure W-LAN application can be utilized to transfer the reducing currency denomination composite code data to the POS system. When finalized, the reducing currency denomination composite code balances and related data may be transferred back to the mobile POS via the IR/W-LAN connection and the balances may be updated for further use.

Devices for Storing Composite Codes or Portions Thereof

Many types of devices can be used to store composite codes, or portions thereof. Such devices may interface not only with the SPP-P during a transaction, but other system components as well, such as the SCC.

Figure 26:
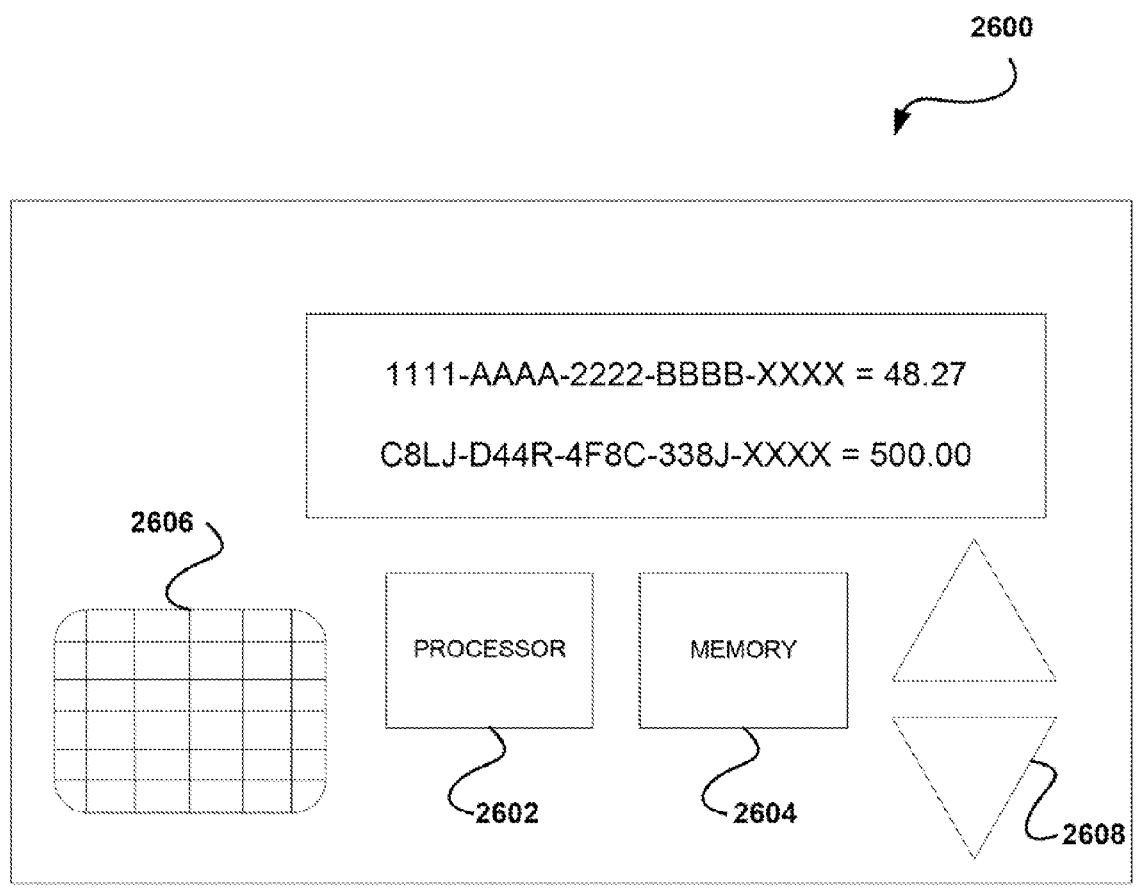
FIG. 26 shows a general device storing at least a portion of a reducing currency denomination composite code, in accordance with one illustrative embodiment.

A preferred general device 2600 for storing at least a portion of a reducing currency denomination composite code can be described, for example, with reference to FIG. 26. As shown, the device 2600 comprises a processor 2602. In the context of the present description, the processor 2602 may be any type of processor, for example a microprocessor, etc.

In addition, the device 2600 comprises a memory 2604 coupled to the processor. The memory 2604 stores a portion of a reducing currency denomination composite code corresponding to a predetermined amount of currency, where the complete reducing currency denomination composite code includes a security code.

Further, the device 2600 comprises an output device 2606 coupled to the processor. The output device 2606 outputs at least the portion of the reducing currency denomination composite code. The output, device may be any device capable of producing an output.

In another preferred general approach, the output device may be a physical machine interface, such as a bus. In another example, the output device may be a visual display. Further, portions of multiple reducing currency denomination composite codes may be output on the visual display. Further still, the device may comprise a selection device which allows selection of at least one of the portions of the multiple reducing currency denomination composite codes.

In one embodiment, the output device may be a wireless machine interface for transmitting at least the portion of the reducing currency denomination composite code via a wireless signal.

In yet another preferred general approach, the device may comprise a wireless machine interface for transmitting at least the portion of the reducing currency denomination composite code via a wireless signal. Further, the device may comprise a selection device which allows entry of a security code, where the security code is part of the reducing currency denomination composite code.

In another embodiment, the device may comprise circuitry for performing wireless telephone communication. Further, the device may comprise a secondary authorization mechanism. For example, the device may comprise a biometric device, manual entry device, etc.

Illustrative devices include a phone, Personal Digital Assistant (PDA), smart card, etc.

Smart Card System

Figure 28:
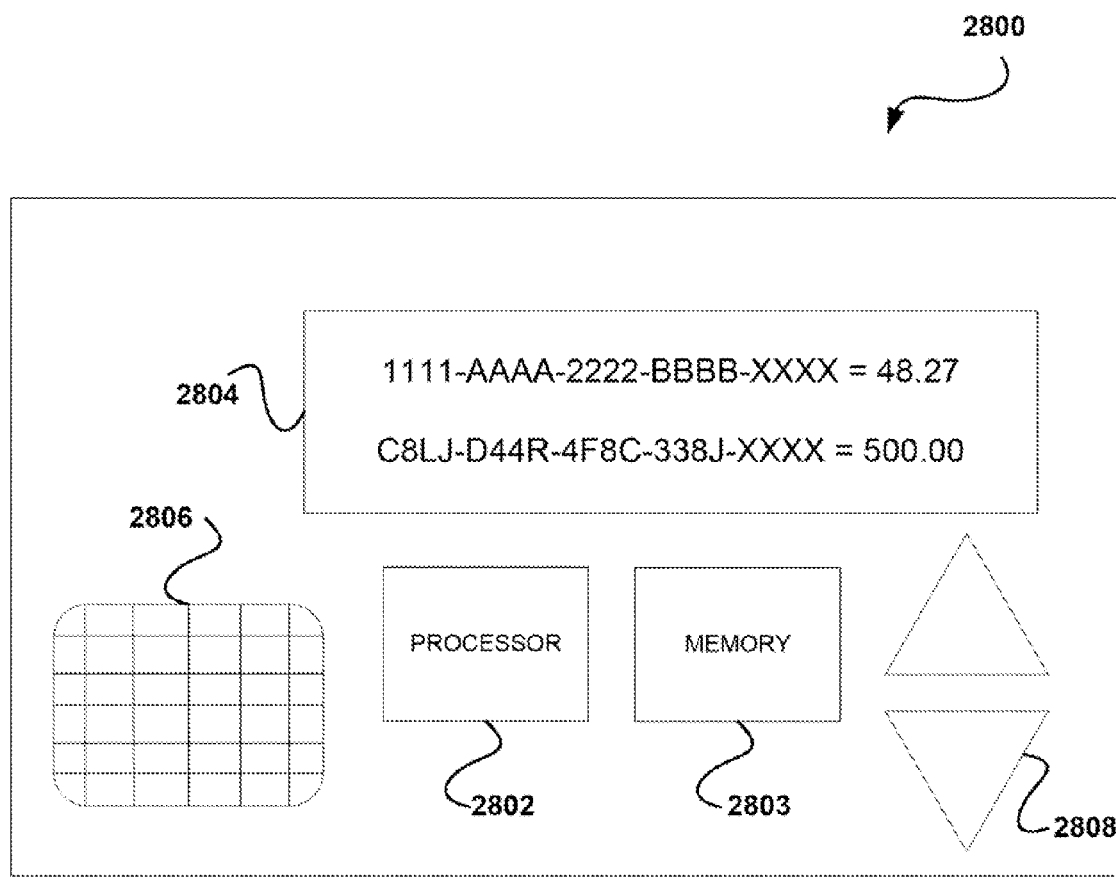
FIG. 28 illustrates a smart card for storing at least portions of multiple reducing currency denomination composite code in accordance with one illustrative embodiment.

The smart card system is one example of a user interface to the SPP-P system. A preferred general embodiment of a smart card 2800 for storing at least portions of multiple reducing currency denomination composite codes can be described, for example, with reference to FIG. 28. As shown, the smart card 2800 comprises a processor 2802. In addition, the smart card 2800 comprises a memory 2803 coupled to the processor. The memory stores at least portions of a plurality of reducing currency denomination composite codes each corresponding to a predetermined amount of currency, where the complete reducing currency denomination composite code includes a security code.

Additionally, the smart card 2800 comprises a visual display 2804 coupled to the processor. The visual display 2804 displays at least the portion of the reducing currency denomination composite code.

Further, the smart card 2800 comprises an interface 2806 for allowing transfer of at least the portion of the reducing currency denomination composite code via a wireless signal. The interface 2806 may comprise any type of interface. In one embodiment, the interface 2806 may comprise a wireless machine interface. As another option, the interface 2806 may include a series of contact pads.

In another embodiment, the smart card 2800 may optionally comprise a selection device 2808 allowing selection of at least one of the portions of the multiple reducing currency denomination composite codes. Further, the smart, card 2800 may optionally comprise a selection device 2808 allowing entry of a security code, the security code being part of the reducing currency denomination composite code.

Further still, the smart card 2800 may optionally comprise a secondary authorization mechanism. For example, the smart card 2800 may comprise a biometric device, a manual entry device, etc.

In another preferred general approach of the general embodiment, the smart card may be synchronized with the users SCC via the Smart card reader. The Smart card reader is a data capture and transfer device and may be used for synchronization with the SCC. Specified reducing currency denomination composite codes (core sequence only) may be transferred to the smart card, and the remaining balance amounts may be listed. The reducing currency denomination composite codes can then be utilized and transacted in a POS transaction via the SMI-P. Upon registration, the serial ID of the user's smart card may be stored in the SCE for authentication purposes. However, any information stored in the smart card may also be stored for purposes of authentication.

The Smart card may be able to hold any number of reducing currency denomination composite codes and the related balances. Prior to initiating a transaction, the user can select the reducing currency denomination composite code/reducing currency denomination composite codes to be used for a stated transaction via a control module on the card, e.g. navigational buttons, touch sensitive pads, etc. The user may then select and utilize the stated reducing currency denomination composite code/M-reducing currency denomination composite codes in the transaction. If no specific reducing currency denomination composite codes are selected, the terminal may automatically select a value, for example, the highest value reducing currency denomination composite codes, and may further select subsequent reducing currency denomination composite codes in descending order per an internal optimization feature. However, reducing currency denomination composite codes may be selected by the terminal through any method and in any order.

The smart card may be inserted into a smart card reader or related compatible interface at a terminal, e.g. a merchant terminal, bank terminal, ATM terminal, etc. When prompted, the user may enter the remaining PIN Code section to complete the reducing currency denomination composite code sequence and process the transaction. Following the transaction, data from the terminal, e.g. the updated reducing currency denomination composite code balances, completed reducing currency denomination composite code status, transaction summary, etc, may be transferred to the smart card for update and subsequent usage.

Another preferred general approach of the smart card is secure smart card, with a data chip, limited data storage, and thin LCD display. In one embodiment, the portable card may maintain the current dimensions and footprint of current magstripe and standard smart-card systems (3×5×2 MM). En another embodiment, the smart card may have the following components: a main 32-bit CMOS chip, with three command buttons (Up/Down/Enter), and a 2-Line LCD display, for the presentation of all key reducing currency denomination composite code/transactional data.

SPP-P: Transactional Process

A preferred general method for performing a monetary transaction includes receiving a first code from a client device. The first code may be received in any manner, for example, via an air interface. The client device may be any device capable of sending the first code. Examples of such devices are presented above, and may also include the client computer running the SCC. A security code is received via manual input. Furthermore, the security code is combined with the first code for creating a composite code, where the composite code is preassociated with a predetermined currency value. The composite code is submitted to a third party system for further processing. The further processing may comprise any sort of processing. For example, the composite code may be sent online to a third party server, to a merchant device at a point of sale, etc.

As another option, multiple first codes may be received, and the same security code may be combined with each of the first codes.

Figure 29:
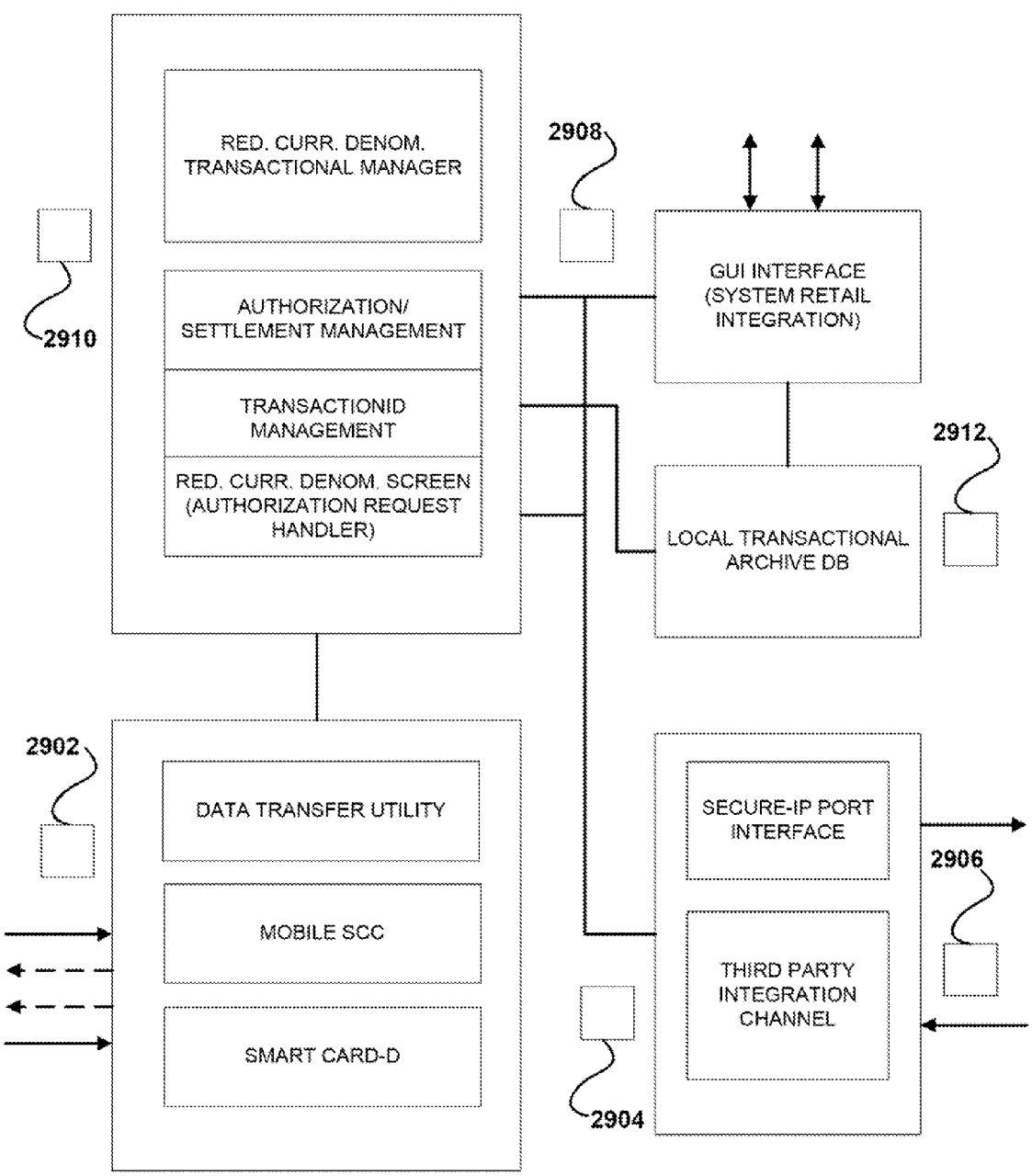
FIG. 29 illustrates another preferred general approach of the general method, in accordance with one illustrative embodiment.

In another preferred general approach of the general method, a POS transaction occurs as shown in FIG. 29. Upon checkout, in operation 2902 the user is prompted for the stated required payment amount. The user will then enter the necessary reducing currency denomination composite code/ reducing currency denomination composite codes via the selected method; Mobile SCC, smart card, or any other device.

With the mobile SCC, the user may be allowed to access the POS function in the mobile SCC (reducing currency denomination composite code optimization feature optional) and select the reducing currency denomination composite code/M-reducing currency denomination composite codes to be utilized. The user may be allowed to enter the PIN code sequence, and transfer the completed reducing currency denomination composite code composite via the IR/W-LAN Channel.

With the smart card, the user may be allowed to enter the smart card into the provided smart card compatible reader/terminal. The user may also be allowed to enter the PIN sequence to complete the reducing currency denomination composite code composite sequences. If no specific reducing currency denomination composite codes are requested, the access the highest value reducing currency denomination composite codes first, with the stated balances, to process the transaction.

In a non-user-initiated transaction, e.g. a transaction initiated by a restaurant, server, etc, the user may be allowed to enter the PIN code sequences on the card prior to giving it to the other individual. This is achieved via the input options on the card. The user may be allowed to select the reducing currency denomination composite code/reducing currency denomination composite codes to use. Then the user may be allowed to click on the reducing currency denomination composite codes and enter the completion feature. The user may then be allowed to scroll up/or down to enter the required characters, hitting the enter button to complete the character and sequence. The card is then be ready to be processed. In one approach, the only transaction allowed on the card may be an authorization request from an authorized SMI-P. Any additional attempt to access the data on the card prior to its entrance into the terminal will not be allowed. A local wireless card reader may be brought to the individual to streamline the process. In addition, the PIN code data is preferably not stored on the smart card following the transaction.

In operation 2904, the completed reducing currency denomination composite code/M-reducing currency denomination composite code sequences are sent to the reducing currency denomination composite code transactional manager for processing. The reducing currency denomination composite code transactional manager may send the authorization request to the SCE via the secure-IP port interface. The reducing currency denomination composite code data screen feature may additionally prevent any capture of the full reducing currency denomination composite code composite sequence. The authorization request is preferably sent with an identifier signifying a POS transaction, thus not requiring the same authorization parameters inherent in a direct remote/e-commerce transaction (address, client data, digital ID, etc.). However, one or more data parameters may be sent for secondary authorization, for example, the mobile SCC serial ID, the smart card serial ID, etc. This data, may be shielded from capture by the merchant as well via the reducing currency denomination composite code shield.

In operation 2906, the SCE authenticates the state reducing currency denomination composite code/M-reducing currency denomination composite codes against the stated mobile SCC/smart card serial ID. In addition, the transaction may be noted as a POS/SMI-P transaction, and the additional authentication items may be bypassed. Upon authentication, the reducing currency denomination composite code/M-reducing currency denomination composite codes may be processed in the same manner as the regular reducing currency denomination composite code transactions (reducing currency denomination composite code Auth/Financial Auth/Ect.). A transaction ID file may be created and sent to the SMI-P.

In operation 2908, the transaction ID file is stored in the reducing currency denomination composite code transaction manager, and the successful authentication notification may be sent to the data transfer utility for update to the user's transactional interface (mobile SCC, smart card), in addition, the successful transaction notification may be sent to the GUI interface for notification. In addition, the transaction ID file (number only), may be given to the user per the standard receipt process for notification.

In operation 2910, when ready, the merchant can be allowed to initiate a reducing currency denomination composite code settlement transaction via the reducing currency denomination composite code transactional manager. The settlement may be processed in the same manner as all additional transactions, and the balances updated. The stated fond transfer may be initiated as well.

In operation 2912, upon settlement request initiation, the transaction ID file and related transactional data may be sent to the transactional archive/DB for storage and further analysis or transaction reconciliation.

While the present invention has been illustrated and described with reference to specific embodiments, further modification and improvements will occur to those skilled in the art. The present description has thus been presented to enable any person skilled in the an to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown or described, but is to be accorded the widest scope consistent with the principles and features disclosed herein.

In particular, various embodiments discussed herein may be implemented using the Internet as a means of communicating among a plurality of computer systems. One skilled in the art will recognize that the present invention is not limited to the use of the Internet as a communication medium and that alternative methods of the invention may accommodate the use of a private intranet, a LAN, a WAN, a PSTN or other means of communication, in addition, various combinations of wired, wireless (e.g., radio frequency) and optical communication links may be utilized.

The program environment in which a present embodiment of the invention may be executed illustratively incorporates one or more general-purpose computers or special-purpose devices. Details of such devices (e.g., processor, memory, data storage, input and output devices) are well known and are omitted for the sake of clarity.

It should also be understood that the techniques presented herein might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a carrier wave, disk drive, or computer-readable medium. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily adapted to employ other forms of directing the operation of a computer.

Various embodiments can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, such software can be downloadable or otherwise transferable from one computing device to another via network, wireless link, non-volatile memory device, etc.

Additionally, some or all of the aforementioned code may be embodied on any computer readable storage media including tape, flash memory, system memory, hard drive, etc. Additionally, a data signal embodied in a carrier wave (e.g., in a network including the Internet) can be the computer readable storage medium. Additionally, some or all of the code may be printed or otherwise visually displayed on an object. For example, some or all of the code may be displayed on a card, paper, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A method for generating a code representative of a currency value, the method comprising:
   generating a first code using a processor, the first code comprising a first number of characters;
   combining, by the processor, a security code comprising a second number of characters with the first code to create a composite code, the composite code comprising a third number of characters, wherein combining the security code with the first code includes inserting the security code between ends of the first code such that at least one character of the first code is positioned on each end of the composite code to mask the location of the security code;
   associating, by the processor, the composite code with the currency value;
   replacing, by the processor, at least one character associated with the first code in the composite code with at least one notation character to define a modified composite code, wherein the notation character specifies a financial transaction associated with the composite code; and
   storing the modified composite code comprising the at least one notation character on a non-transitory computer readable storage medium.

2. The method as recited in claim 1, further comprising transmitting a portion of the composite code to at least one client, the portion of the composite code not including the security code; receiving the composite code from a vendor during a monetary transaction; and receiving verification of an availability of a fund amount associated with the composite code sufficient for the monetary transaction.

3. The method as recited in claim 1, further comprising transmitting, independently of the composite code, the security code to at least one client.

4. The method as recited in claim 1, wherein the security code is a user-selected code.

5. The method as recited in claim 1, further comprising generating the security code.

6. The method as recited in claim 1, wherein combining the security code with the first code includes inserting portions of the security code in a non-consecutive string in the composite code.

7. The method as recited in claim 1, further comprising receiving a user-selected position of the security code in the composite code and inserting the security code in the user-selected position.

8. The method as recited in claim 1, further comprising receiving a definition of the currency value as a maximum value that can be associated with the composite code for a remaining life of the composite code.

9. The method as recited in claim 1, the composite code further comprising generating a plurality of composite codes being usable in monetary transactions, associating each composite code with a unique currency value, outputting the currency values associated with the composite codes to a display device along with at least the first codes of the respective composite codes; receiving user selection of at least one of the first codes; and initiating a transaction using the composite code associated with the user-selected at least one of the first codes for payment.

10. The method as recited in claim 1, wherein the notation character specifies use for a recurring payment.

11. The method as recited in claim 1, wherein the notation character specifies use for transactions of limited amounts of money.

12. The method as recited in claim 1, wherein the notation character contains unique identifying characteristics.

13. The method as recited in claim 1, wherein the notation character or a second notation character indicates a maximum value that can be associated with the composite code.

14. The method as recited in claim 1, wherein the composite code expires upon some event, and further comprising permanently retiring the composite code upon expiration thereof.

15. The method as recited in claim 1, wherein the composite code expires upon some event, wherein the composite code is not, reused after expiration thereof until a predetermined amount of time has elapsed after expiration thereof.

16. The method as recited in claim 1, wherein the composite code expires upon some event, wherein the composite code is not reused after expiration thereof until an authorizing entity revives the composite code.

17. The method as recited in claim 1, wherein the composite code has less than 100 characters.

18. The method as recited in claim 1, wherein the composite code has less than 50 characters.

19. The method as recited in claim 1, wherein the composite code is usable more than once, wherein the currency value associated with the composite code changes upon each use.

20. The method as recited in claim 1, wherein the currency value is a reducing currency value.

21. The method as recited in claim 1, further comprising receiving the composite code as part of a financial transaction for a payment amount, verifying an availability of funds to pay the payment amount, and authorizing payment of the payment amount if funds are available to pay the payment amount.

22. The method as recited in claim 1, further comprising receiving the composite code as part of a financial transaction, and determining whether the composite code with the notation is valid for the financial transaction based on the notation.

23. A computer program product comprising a computer useable medium having a computer readable program stored thereon, wherein the computer readable program when executed on a computer causes the computer to execute the method of claim 1.

24. A system, comprising:
a processor coupled to a non-transitory memory, the memory storing machine executable instructions that when executed by the processor, cause the processor to:
generate a first code using a processor, the first code comprising a first number of characters;
combine a security code comprising a second number of characters with the first code to create a composite code, the composite code comprising a third number of characters, wherein the security code is inserted between the ends of the first code such that the composite code comprises at least one character of the first code at each end and to mask the security code in transit;
associate the composite code with the currency value;
replace at least one character associated with the first code in the composite code with at least one notation character to define a modified composite code, wherein the at least one notation character specifies a financial transaction associated with the composite code; and
store the modified composite code comprising the at least one notation character on a non-transitory computer readable storage medium.

25. A method for generating a code associated with a currency value, the method comprising:
receiving a request from a user device for a code corresponding to a currency value;
generating a first code, the first code comprising a first number of characters;
embedding a security code comprising a second number of characters in the first code to create a larger composite code, the composite code comprising a third number of characters, wherein embedding the security code with the first code comprises inserting the security code between ends of the first code such that at least one character of the first code is positioned on each end of the composite code to mask the location of the security code:
associating the composite code with the currency value;
sending the first code to the user device with the security code omitted to render the composite code unusable in an idle state except when combined with the security code; and
receiving a selection of the security code from the user device to complete the composite code.

26. The method as recited in claim 25, further comprising sending the first code to the user in a packet requiring unique authorization data to access the first code.

27. The method as recited in claim 25, wherein the first code is unusable to conduct a monetary transaction in any form except when combined with the security code to form the composite code.

28. The method as recited in claim 25, wherein the security code is a user-selected code.

29. The method as recited in claim 25, wherein the security code is not user-selected.

30. The method as recited in claim 25, further comprising receiving an activation notice from the user device, and indicating that the composite code is available for use.

31. The method as recited in claim 25, further comprising determining whether funds pertaining to the user and at least matching the currency value are available, wherein at least: one of the steps of the method is performed by a processor.

32. A computer program product comprising a computer useable medium having a computer readable program stored thereon, wherein the computer readable program when executed on a computer causes the computer to execute the method of claim 25.

33. A system, comprising:
a processor coupled to a non-transitory memory, the memory storing machine executable instructions that when executed by the processor, cause the processor to:
receive a request from a user device for a code corresponding to a currency value;
generate a first code, the first code comprising a first number of characters;
embed a security code comprising a second number of characters in the first code to create a larger composite code, the composite code comprising a third number of characters, wherein embedding the security code with the first code comprises inserting the security code between end of the first code such that at least one character of the first code is positioned on each end of the composite code to mask the location of the security code:
associate the composite code with the currency value;
send the first code to the user device with the security code omitted to render the composite code unusable in an idle state except when combined with the security code; and
receive a selection of the security code from the user device to complete the composite code.

* * * * *